(12) United States Patent
Tomoda et al.

(10) Patent No.: US 7,577,062 B2
(45) Date of Patent: Aug. 18, 2009

(54) RECORDING MEDIUM CONTROLLER AND RECORDING MEDIUM CONTROLLING METHOD

(75) Inventors: Masaaki Tomoda, Suita (JP); Fusanori I, Ikoma (JP); Masahiko Samura, Osaka (JP); Junichi Ikeda, Neyagawa (JP)

(73) Assignee: Panasonic Corporation, Osaka (JP)

(*) Notice: Subject to any disclaimer, the term of this patent is extended or adjusted under 35 U.S.C. 154(b) by 395 days.

(21) Appl. No.: 10/559,061

(22) PCT Filed: Jun. 7, 2004

(86) PCT No.: PCT/JP2004/008267

§ 371 (c)(1),
(2), (4) Date: Dec. 1, 2005

(87) PCT Pub. No.: WO2004/109700

PCT Pub. Date: Dec. 16, 2004

(65) Prior Publication Data

US 2006/0153036 A1 Jul. 13, 2006

(30) Foreign Application Priority Data

Jun. 5, 2003 (JP) .............................. 2003-160980

(51) Int. Cl.
*G11B 7/00* (2006.01)
(52) U.S. Cl. .................................................. 369/30.1
(58) Field of Classification Search ................ 369/30.1, 369/30.03, 30.4, 53.16
See application file for complete search history.

(56) References Cited

U.S. PATENT DOCUMENTS

| 5,642,344 | A | * | 6/1997 | Yamada et al. ............. 369/77.2 |
| 5,740,143 | A | | 4/1998 | Suetomi |
| 6,269,420 | B1 | | 7/2001 | Horie |
| 2001/0048642 | A1 | * | 12/2001 | Berhan ........................... 369/5 |
| 2002/0126553 | A1 | * | 9/2002 | Denda et al. ................. 365/200 |
| 2003/0002399 | A1 | * | 1/2003 | Millikan et al. .......... 369/30.23 |
| 2003/0117908 | A1 | * | 6/2003 | Goolkasian .............. 369/30.26 |

FOREIGN PATENT DOCUMENTS

| JP | 63-184849 A | 7/1988 |
| JP | 4-141696 A | 5/1992 |
| JP | 7-65507 A | 3/1995 |
| JP | 11-175381 A | 7/1999 |
| JP | 2001-67848 A | 3/2001 |
| JP | 2002-245720 A | 8/2002 |
| JP | 2003-157621 A | 5/2003 |

* cited by examiner

*Primary Examiner*—Wayne R Young
*Assistant Examiner*—Brian Butcher
(74) *Attorney, Agent, or Firm*—Panitch Schwarze Belisario & Nadel LLP

(57) ABSTRACT

A battery-operated recording medium controller monitors the ID of a replayed melody and when a replay ID comparing section (A126) makes a decision that a melody of the same ID as the previous one is replayed, a section (A127) for judging necessity of auxiliary information designates an auxiliary information access control section not to acquire auxiliary information (ID3 tag) again from a disc but to reuse auxiliary information stored in an auxiliary information storing section A. Consequently, the number of times of accessing the recording medium is decreased, and when the auxiliary information added to reproduction data like the ID3 tag of an MP3 is acquired, moving distance of an optical pickup is decreased and current consumption can be reduced.

9 Claims, 14 Drawing Sheets

Fig. 8

824 PLAYBACK ID MANAGEMENT TABLE A

| PLAYBACK ID | ABSOLUTE RECORDING POSITION ON OPTICAL DISK |
|---|---|
| 1 | 00 MIN. 02 SEC. 00 FLAME |
| 2 | 01 MIN. 22 SEC. 00 FLAME |
| 3 | 03 MIN. 02 SEC. 00 FLAME |
| 4 | 04 MIN. 31 SEC. 00 FLAME |
| ... | ... |
| N | 70 MIN. 10 SEC. 00 FLAME |

Fig. 9

924 PLAYBACK ID MANAGEMENT TABLE B

| OPTICAL DISK ID | PLAYBACK ID | ABSOLUTE RECORDING POSITION ON OPTICAL DISK |
|---|---|---|
| 1 | 1 | 00 MIN. 02 SEC. 00 FLAME |
| 1 | 2 | 01 MIN. 22 SEC. 00 FLAME |
| 1 | ... | ... |
| 1 | N | 70 MIN. 10 SEC. 00 FLAME |
| 2 | 1 | 00 MIN. 02 SEC. 00 FLAME |
| 2 | 2 | 02 MIN. 32 SEC. 00 FLAME |
| 2 | ... | ... |
| 2 | N | 69 MIN. 20 SEC. 00 FLAME |
| ... | ... | |
| M | 1 | 00 MIN. 02 SEC. 00 FLAME |
| M | 2 | 02 MIN. 50 SEC. 00 FLAME |
| M | ... | ... |
| M | N | 71 MIN. 30 SEC. 00 FLAME |

OPTICAL DISK ID=1 (rows 1–N)
OPTICAL DISK ID=2 (rows 1–N)
OPTICAL DISK ID=M (rows 1–N)

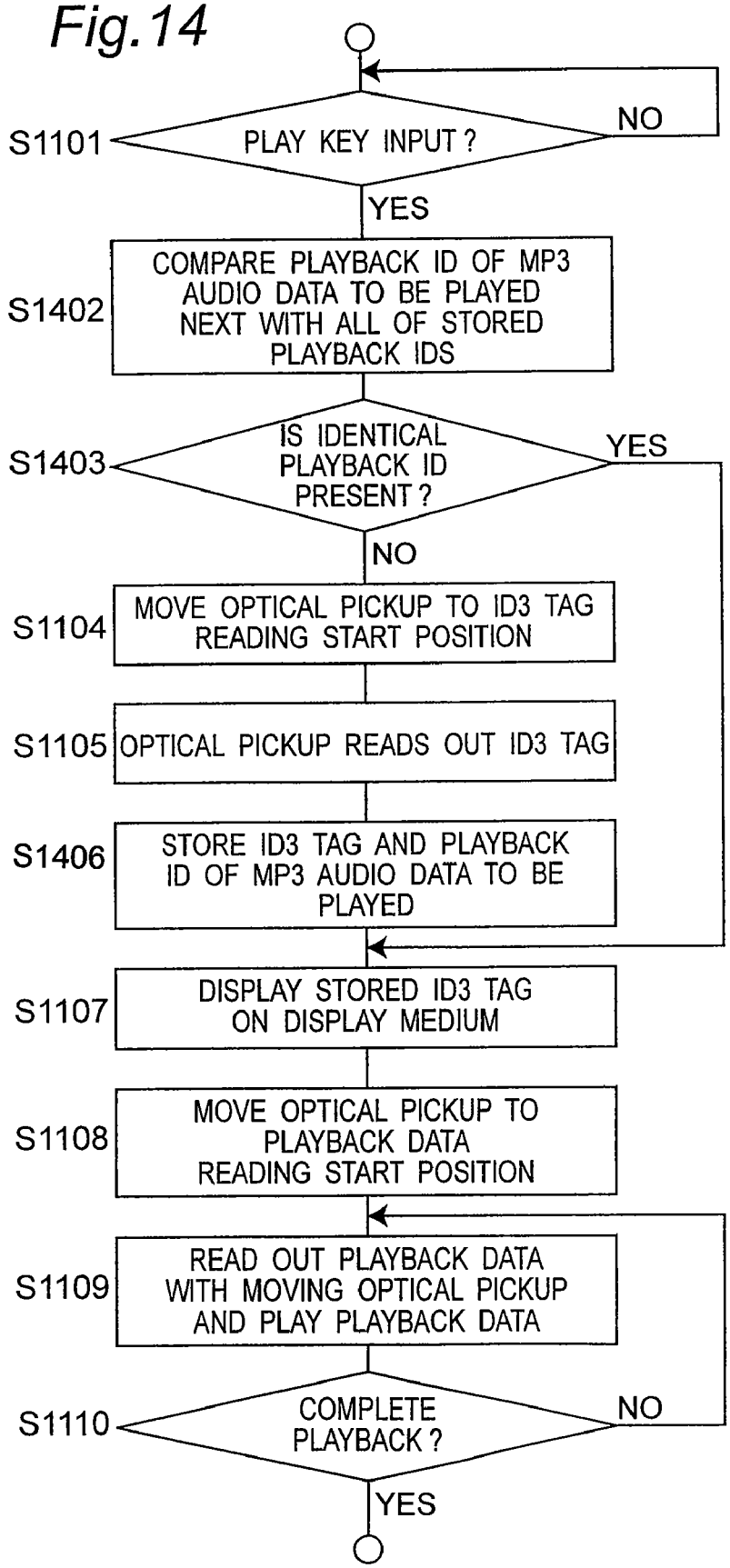

RECORDING MEDIUM CONTROLLER AND RECORDING MEDIUM CONTROLLING METHOD

TECHNICAL FIELD

The present invention relates to a recording medium control apparatus and a recording medium control method for restraining the power consumption when playback data are read out from a recording medium and attempting increase of operation duration time of a battery; and more specifically, relates to a recording medium control apparatus and a recording medium control method for restraining the power consumption in the case of reading out auxiliary information from a recording medium in which one or more sets of playback data and auxiliary information added to the playback data are recorded and attempting increase of operation duration time of a battery.

BACKGROUND ART

For a battery driven mobile apparatus that plays data from a recording medium (a recording medium control apparatus), it is requested from the market to reduce power consumption of the apparatus and to increase continuous operation time of a battery.

A recording medium control apparatus of a prior art that intends to increase the operation time of a battery is disclosed in the Japanese patent laid-open publication No. Hei 07-065507. The recording medium control apparatus of the prior art will be explained below.

Data are read out from a rotation-driven disk by an optical head, and then servo control of the optical head and a spindle motor is executed based on an error signal generated from an output signal thereof. A decoding process is performed on the output signal from the optical head, the data are stored once in a memory, and then the data are read out at a speed, which is slower than the writing speed of the data outputted from the decoding part. A first period in which data recorded on the disk are read out by the optical head and written in the memory and a second period in which the reading of data is stopped and only the reading-out of the data stored in the memory is executed are set alternately. In such a manner, the optical head and the memory are controlled by a controller so that the data recorded on the disk are read out intermittently, and during the second period the servo control operation of the servo control part is stopped. This leads that the recording medium control apparatus can be reduced consumption of wasteful electric power.

The configuration of the recording medium control apparatus of the prior art is particularly effective to reduce the consumption of current as far as it handles only the data recorded contiguously such as the playback data. However, for example, in the case that an ID3 tag which is auxiliary information (data such as title name, artist name or the like) is added to the end of MP3 audio data which are playback data, it is necessary to obtain the ID3 tag which is auxiliary information, in advance to the playback so as to display the ID3 tag on a display device. Therefore a mechanical action that an optical pickup is once moved down to the end of music data by a traverse motor in order to obtain the ID3 tag before the optical pickup is put back to the head of the music data again is required. Since the traverse motor moves twice for the playback of one-piece of music and the total driving distance thereof is longer than that in the case that the traverse motor moves once from the top to the end of the MP3 data recording region, a problem that consumption of current becomes large remains.

The recording medium control apparatus of the prior art handling such the auxiliary information is explained below referring to the drawings. FIG. 10 is a block diagram showing a configuration of an optical disk controller of the prior art, FIG. 6 is a diagram showing a data configuration of the MP3 (Mpeg Audio Layer 3) data which are music data, and FIG. 7 is a diagram showing an arrangement of playback data on the playback data recording part 710 and the auxiliary information recording part 711 and an operation of an optical pickup for reading those data.

As shown in FIG. 10, the optical disk control apparatus 1000 includes a spindle motor 111, an optical pickup 112, a traverse motor 113, a system control part 114, a playback control part 1020, an auxiliary information access control part C1021, and a playback-data access control part 122.

As shown in FIG. 6, MP3 data 610, which are music data, consists of MP3 audio data 611, which is a playback data part, and an ID3 tag 612, which is an auxiliary information part and is added to the end of the MP3 audio data 611. The ID3 tag 612, which is the auxiliary information part, is sometimes added to the head of the MP3 audio data 611. In addition, a plurality of sets of the MP3 data 610 consisting of the MP3 audio data 611 and the ID3 tag 612 are recorded on an exchangeable optical disk 110 in FIG. 10.

The optical disk control apparatus 1000 configured as described above will be explained referring to FIGS. 10, 6 and 7. In the optical disk control apparatus 1000 shown in FIG. 10, during the optical disk 110 is being rotated by the spindle motor 111, the optical pickup 112 is moved by the traverse motor 113, and then the optical pickup 112 reads out the data recorded on the optical disk 110. The system control part 114 processes the data having been read and outputs a sound L channel signal and a sound R channel signal as a playback signal. Also the system control part 114 executes focus servo control and tracking servo control of the optical pickup 112 when reading out data from the optical disk 110, rotation control of the spindle motor 111 for stable rotation of the optical disk 110, and rotation control of the traverse motor 113 to move the optical pickup 112 to a destination access position on the optical disk 110.

Hereupon, when a key-inputting from outside is made, a playback control part E1020 operates according to the key input. For example, in the case that a PLAY key-inputting is made in a stopped state, the playback control part E1020 instructs a playback-data access control part 122 to play a signal. The playback-data access control part 122 requests to the system control part 114 accessing of the playback data. The system control part 114 controls the spindle motor 111 and the traverse motor 113 according to the request to access the playback data to move the optical pickup 112 to the destination position of the playback data on the optical disk 110. The optical pickup 112 reads out the destination playback data. The system control part 114 processes the data having been read to output the sound L channel signal and the sound R channel signal as the playback signal. Furthermore, in the case that the auxiliary information (ID3 tag) is added to the playback data, the playback control part E1020 instructs the auxiliary information access control part C102 in order to obtain the auxiliary information (ID3 tag). The auxiliary information access control part C1021 requests to the system control part 114 accessing of the auxiliary information. The system control part 114 controls the spindle motor 111 and the traverse motor 113 according to the request of the auxiliary information access to move the optical pickup 112 to a position of the destination auxiliary information (ID3 tag) on the optical disk 110. The optical pickup 112 reads out the destination auxiliary information (ID3 tag). The playback control part E1020 analyzes the auxiliary information (ID3 tag) having been read to output and displays it.

FIG. 7 is a diagram showing the state in which the optical pickup 112 is moved by the traverse motor 113 to read out the playback data recording part 710 and the auxiliary information recording part 711 of the audio data of one-music-piece recorded on the optical disk 110. Contiguous recording regions, each consisting of the playback data recording part 710 and the auxiliary information recording part 711 of audio data of one-music-piece, are provided as many number as recorded number of music pieces on the optical disk 110. In FIG. 7, one of the recording regions consisting of the audio data 710 and the auxiliary information recording part 711 of one-music-piece is enlarged and shown. FIG. 7(b) is an enlarged view of a part of FIG. 7(a). In FIG. 10, in the case that the above-mentioned PLAY key-inputting is made, the playback-data access control part 122 and the auxiliary information access control part C1021 request to the system control part 114 accessing of the playback data and the auxiliary information. The playback control part E1020 is required to output the ID3 tag (e.g. title name), which is the auxiliary information, at the time of starting the playback. Therefore, as shown in FIG. 7, in the case that the MP3 data are played, the traverse motor 113 moves the optical pickup 112 not directly to a position (1), which is the head position of the MP3 audio data recorded on the playback data recording part 710, but rather to a position (3) in order to obtain the ID3 tag recorded on the auxiliary information recording part 711 according to the request of the auxiliary information access. While the traverse motor 113 moves the optical pickup 112 from the position (3) to the position (4), the optical pickup 112 reads out the ID3 tag. Then, after completion of reading the ID3 tag, the traverse motor 113 puts the optical pickup 112 back to the position (1) according to the request of the playback data access so as to play the MP3 audio data recorded in the playback data recording part 710. During the while the traverse motor 113 moves the optical pickup 112 from the position (1) to the position (2), the optical pickup 112 reads out the MP3 audio data. The system control part 114 outputs the playback signal.

In the recording medium control apparatus of the prior art, in the case that the auxiliary information ID3 tag is added at the end of the MP3 audio data which are the playback data, since the auxiliary information ID3 tag is required to be obtained prior to the playback, a mechanical action putting the optical pickup back to the head of the music data again is required after moving the optical pickup to the end of the music data once using the traverse motor and obtaining the ID3 tag. To play one-piece of music, the traverse motor 113 is driven twice, and its total driving distance is longer than that in the case that the traverse motor moves from the head to the end of the recording region of the MP3 data 610 once. Therefore, when this optical disk control apparatus operates with a battery of which power source supply capacity is finite, there has been a problem that more of the remaining capacity of the battery is consumed, and as a result, the operation duration time of the apparatus becomes short.

DISCLOSURE OF INVENTION

The present invention intends to realize a recording medium control apparatus and the recording medium control method for restraining consumption of current in an access part by decreasing the movement of the access part as much as possible to increase battery operation duration time.

To solve the above-mentioned problem, the present invention has configurations described below.

A recording medium control apparatus according to one aspect of the present invention is to execute control for a spindle motor for rotating a recording medium, a pickup for reading out data from the recording medium, and a motor for moving the pickup by a system control part, so as to execute playback data access control for accessing playback data to play the playback data from the recording medium by a playback-data access control part, and auxiliary information access control for accessing an auxiliary information in order to obtain the auxiliary information from the recording medium by an auxiliary information access control part according to a playback control part, over the recording medium on which one or more sets of the playback data and the auxiliary information that is associated with the playback data is recorded, and the recording medium control apparatus includes an auxiliary information storage part for storing the auxiliary information that is associated with the playback data recorded on the recording medium, and an auxiliary information access necessity determining part for determining whether or not an access instruction is to be issued according to whether or not the auxiliary information of the playback data to be played next is present in the auxiliary information storage part, and the apparatus has a configuration wherein, in the case that the auxiliary information that is associated with the playback data to be played next is present in the auxiliary information storage part, the auxiliary information access necessity determining part does not issue an instruction for accessing the auxiliary information to the auxiliary information access control part, and the auxiliary information access control part obtains the auxiliary information that is associated with the playback data to be played next from the auxiliary information storage part.

A recording medium control apparatus according to another aspect of the present invention, as a basic configuration, is to execute control for a spindle motor for rotating a recording medium, a pickup for reading out data from the recording medium, and a traverse motor for moving the pickup by a system control part, so as to execute playback data access control for accessing playback data to play the playback data from the recording medium by a playback-data access control part, and auxiliary information access control for accessing an auxiliary information in order to obtain the auxiliary information from the recording medium by an auxiliary information access control part according to a playback control part, over the recording medium on which one or more sets of the playback data and the auxiliary information that is associated with the playback data is recorded, and the recording medium control apparatus includes a playback ID management table part for managing a playback ID that is an unique ID (an identifier) that can identify the set of the playback data and the auxiliary-information that is associated with the playback data on the recording medium, an auxiliary information storage part for storing the auxiliary information that is associated with the playback data, and a playback ID storing part for storing a present playback ID that is the playback ID of the playback data presently being played, a playback ID comparing part for comparing a next playback ID that is the playback ID of the playback data to be played next with the present playback ID stored in the playback ID storing part, and an auxiliary information access necessity determining part for determining whether or not an instruction of auxiliary information access is to be issued according to comparison results of the playback ID comparing part, and the apparatus has a configuration wherein, in the case that the next playback ID and the present playback ID that is stored in the playback ID storing part are compared by the playback ID comparing part to be equivalent, the auxiliary information access necessity determining part does not issue an instruction for accessing the auxiliary information to the auxiliary information access control part, and the auxiliary information access control part obtains the auxiliary information that is associated with the playback data of the next playback ID from the auxiliary information storage part at playback of the playback data of the next playback ID.

A recording medium control apparatus according to another aspect of the present invention, as a development of the above-mentioned basic configuration, is to include a repeat playback determining part for determining whether or not an instruction of repeat playback for repeat-playing the present playback data is issued, and an auxiliary information access necessity determining part for determining whether or not an instruction of auxiliary information access is to be issued according to determination results of the repeat playback determining part, and the apparatus has a configuration wherein in the case that the playback control part controls repeat-playing the present playback data, the auxiliary information access necessity determining part does not issue an instruction for accessing the auxiliary information to the auxiliary information access control part, and the auxiliary information access control part obtains the auxiliary information that is associated with the present playback data from the auxiliary information storage part at playback of the present playback data by the playback data access for the repeat playback.

A recording medium control apparatus according to still another aspect of the present invention, as a development of the above-mentioned basic configuration, is to include an auxiliary information storage part for storing the auxiliary information that is associated with the playback data, a reverse-skip key determining part for determining whether or not an instruction for executing playback data access control to access a head of the present playback data or a point preceding a present playback position of the present playback data and to start playback is issued, and the apparatus has a configuration wherein, in the case that the playback control part executes the playback data access control to access the head of the present playback data or the point preceding the present playback position of the present playback data and to start playback, the auxiliary information access necessity determining part does not issue an instruction for accessing the auxiliary information to the auxiliary information access control part, and the auxiliary information access control part obtains the auxiliary information that is associated with the present playback data from the auxiliary information storage part.

A recording medium control apparatus according to still another aspect of the present invention, in the above-mentioned basic configuration, has a configuration wherein the auxiliary information storage part is an auxiliary information record storage part for storing a plurality of the auxiliary information, each associated with the playback data, with keeping correspondence with the playback ID, and the playback ID storing part is a playback ID record storing part for storing a plurality of the playback IDs of the playback data that have been played in the past, and wherein, in the case that the next playback ID that is the playback ID of the playback data to be played next and a plurality of the playback IDs stored in the playback ID record storing part by the playback ID comparing part are compared whether they are identical to each other, the auxiliary information access necessity determining part does not issue an instruction for accessing the auxiliary information to the auxiliary information access control part, and the auxiliary information access control part obtains the auxiliary information that is associated with the playback data of the next playback ID from the auxiliary information storage part based on the playback ID at playback of the playback data of the next playback ID.

A recording medium control apparatus according to still another aspect of the present invention, in the above-mentioned basic configuration, has a configuration wherein the auxiliary information storage part is an auxiliary information record storage part for storing a plurality of the auxiliary information, each associated with the playback data, with keeping correspondence with the playback ID, and the playback ID storing part is a playback ID record storing part for storing a plurality of the playback IDs of the playback data that have been played in the past, the recording medium control apparatus further comprising a playback frequency determining part for monitoring the playback ID stored by playback ID record storing part, deleting a rare playback ID that is low playback frequency from the playback ID record storing part, and at the same time, deleting the auxiliary information corresponding to the rare playback ID from the auxiliary information record storage part, wherein, in the case that the next playback ID that is the playback ID of the playback data to be played next and a plurality of the playback IDs stored in the playback ID record storing part are compared whether they are identical to each other by the playback ID comparing part, the auxiliary information access necessity determining part does not issue an instruction for accessing the auxiliary information to the auxiliary information access control part, and the auxiliary information access control part obtains the auxiliary information that is associated with the playback data of the next playback ID from the auxiliary information storage part based on the playback ID at playback of the playback data of the next playback ID.

A recording medium control apparatus according to still another aspect of the present invention, in the configurations of the above-mentioned respective developments, has a configuration wherein the playback ID management table part manages both the unique ID that can identify the set of the playback data and the auxiliary information that is associated with the playback data on the recording medium and the unique ID that can identify the recording medium among a plurality of groups of recording media as the playback ID.

A recording medium control apparatus according to still another aspect of the present invention, as a development of the above-mentioned basic configuration, has a configuration wherein the auxiliary information is bibliographic information that is different from information required for the access to the playback data on the recording medium.

A recording medium control apparatus according to still another aspect of the present invention, as a development of the above-mentioned basic configuration, has a configuration wherein the playback ID and the auxiliary information corresponding thereto are stored in a contiguous region on the recording medium.

A recording medium control method of the present invention according to still another aspect of the present invention is to include the following steps of: rotating a recording-medium on which one or more sets of playback data and an auxiliary information that is associated with the playback data is recorded, making a pickup access the auxiliary information recorded on the recording medium in order to obtain the auxiliary information, and storing the auxiliary information in an auxiliary information storage part, rotating the recording medium and making the pickup access the playback data corresponding to the auxiliary information recorded on the recording medium in order to obtain the playback data, determining whether or not the auxiliary information associated with the playback data to be played next is present in the auxiliary information storage part, and obtaining the auxiliary information from the auxiliary information storage part in the case that the auxiliary information associated with the playback data to be played next is present in the auxiliary information storage part.

According to the above-mentioned respective configurations, the recording medium control apparatus and the recording medium control method of the present invention do not execute the control obtaining the auxiliary information from the recording medium at the next playback in the case that an ID of audio data to be played next has been played in the past. The auxiliary information from the auxiliary information storage part or the auxiliary information record storage part can be reused without moving the pickup. Thereby, the consumption of current in the access part can be restrained, and increase of a battery operation duration time can be realized.

Moreover, the present invention realizes a recording medium control apparatus that suppresses the consumption of current by using an internal memory for storing the auxiliary information.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 8 is a diagram showing an example of a playback ID management table in respective Embodiments of the present invention;

FIG. 9 is a diagram showing an example of a playback ID management table in respective Embodiments of the present invention;

FIG. 14 is a flow chart showing an operation at the time of playback of the recording medium control apparatus in accordance with Embodiment 4 of the present invention.

It will be recognized that some or all of the figures are schematic representations for purposes of illustration and do not necessarily depict the actual relative sizes or locations of the elements shown.

BEST MODE FOR CARRYING OUT THE INVENTION

Embodiment 1

Figure 1:
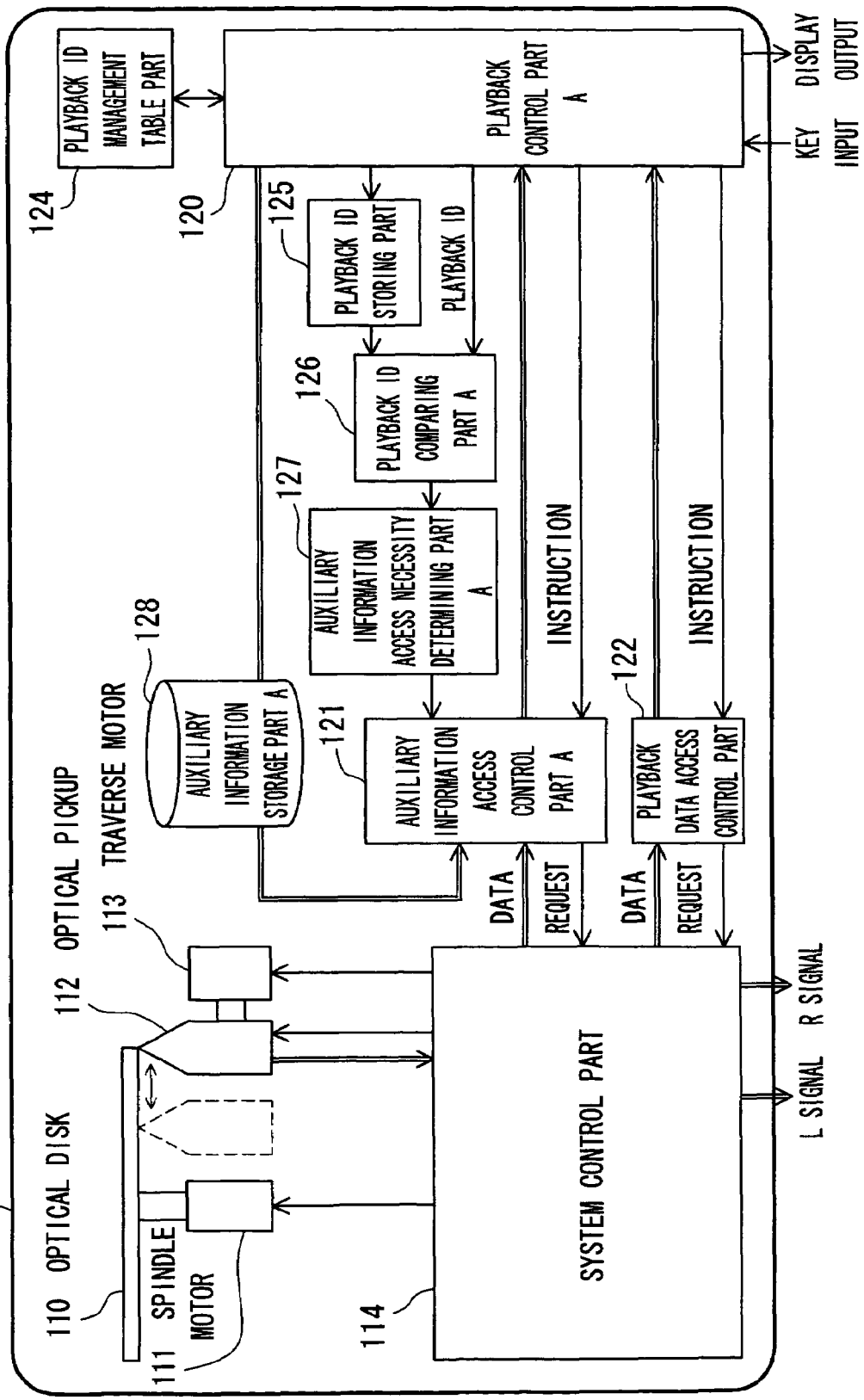
FIG. 1 is a block diagram showing a configuration of a recording medium control apparatus (an optical disk control apparatus) in accordance with Embodiment 1 of the present invention.
Figure 6:
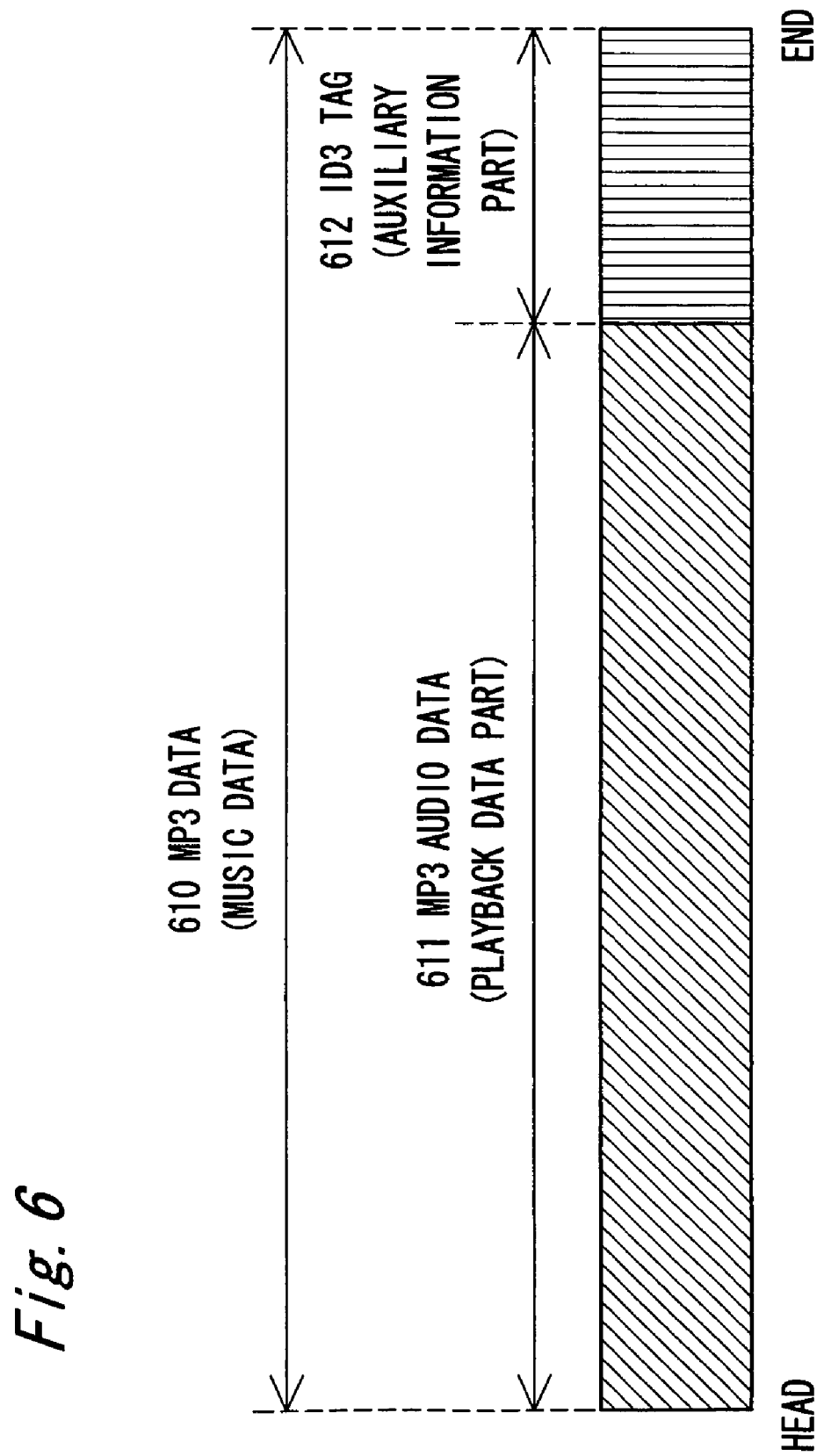
FIG. 6 is a diagram showing a configuration of MP3 data which are music data.
Figure 7:
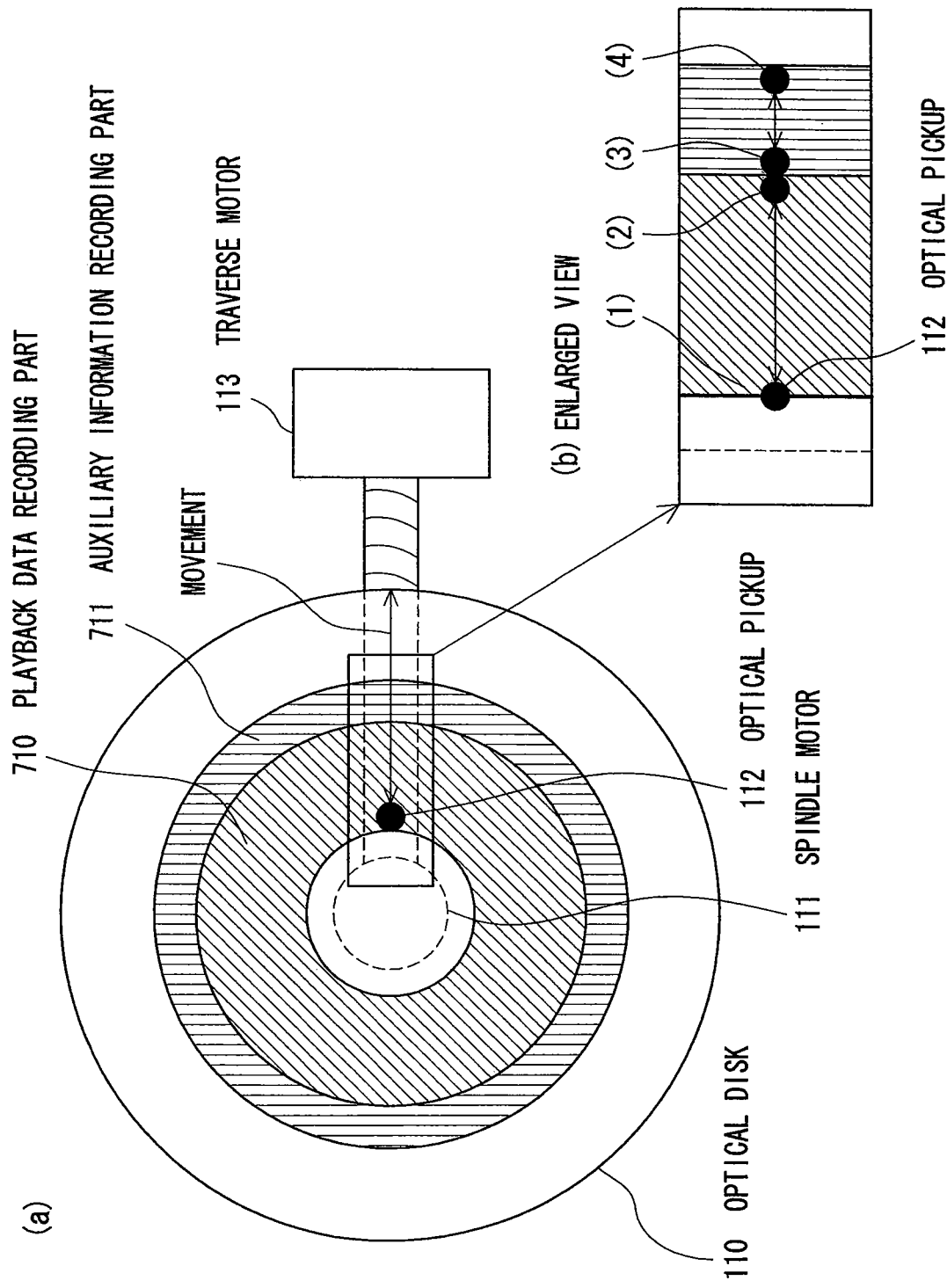
FIG. 7 is a diagram showing an arrangement of a playback data recording part and an auxiliary information recording part and an operation of an optical pickup reading out those data.

A recording medium control apparatus and a recording medium control method embodied in Embodiment 1 of the present invention will be explained referring to the drawings. In the following respective Embodiments, descriptions are given so that an exchangeable optical disk is used as a recording medium and MP3 (Mpeg Audio Layer 3) is recorded as data thereon. FIG. 1 is a block diagram showing a configuration of an optical disk control apparatus of Embodiment 1 of the present invention, FIG. 6 is a diagram-showing a data configuration of the MP3 data which are music data, FIG. 7 is a diagram showing an arrangement of a playback data recording part 710 and an auxiliary information recording part 711 on the exchangeable optical disk and an operation of an optical pickup reading out those data, and FIG. 8 is a diagram showing an example of the playback ID management table. Contiguous recording regions, each consisting of a playback data recording part 710 and an auxiliary information part 711 of audio data of one-music-piece, are provided as many number of as the recorded pieces of music on an optical disk 110. In FIG. 7, one of the recording regions consisting of the audio data 710 and the auxiliary information recording part 711 of one-music-piece is enlarged and shown. FIG. 7(b) is an enlarged view of a part of FIG. 7(a).

Figure 10:
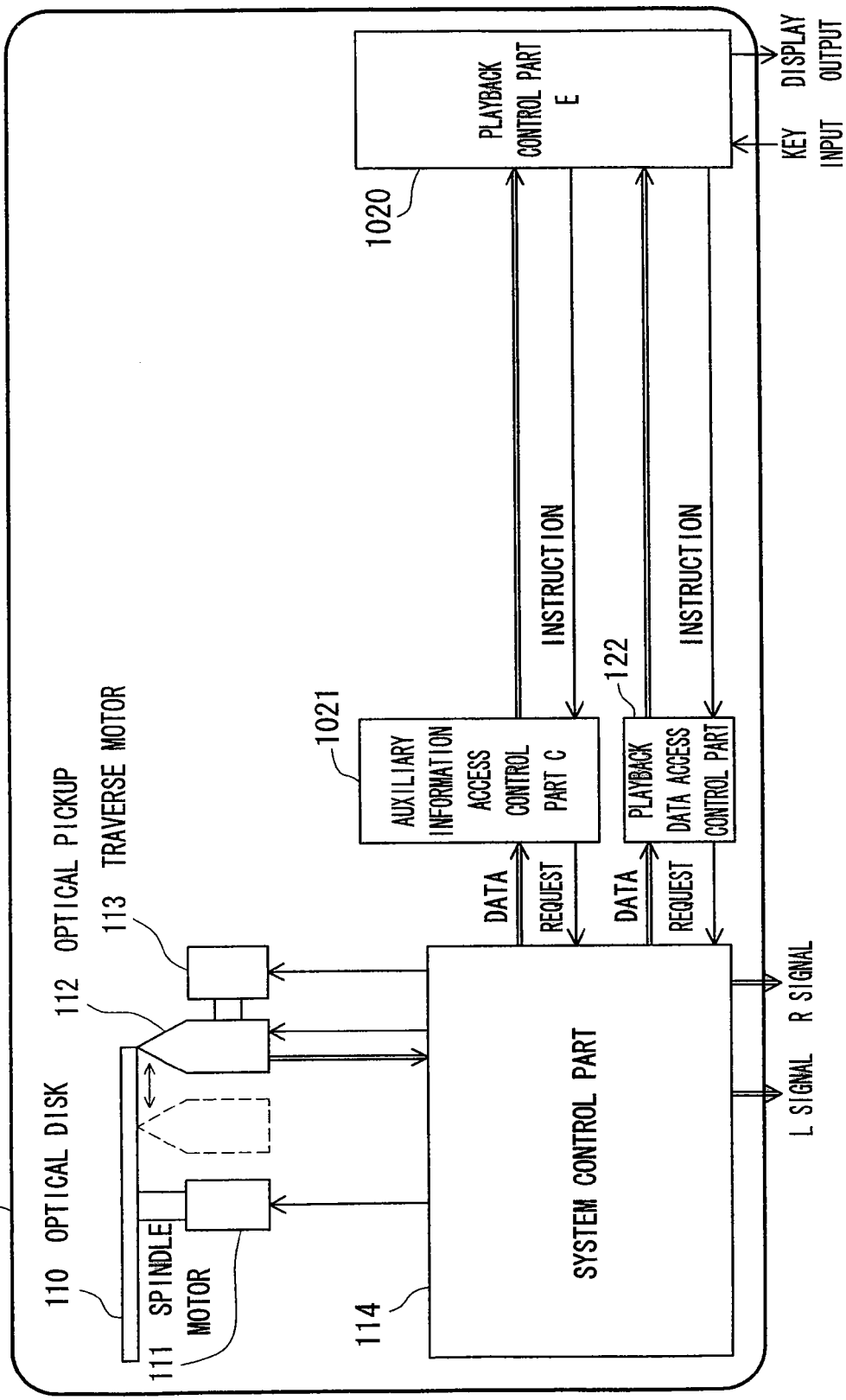
FIG. 10 is a block diagram showing a configuration of a recording medium control apparatus (an optical disk control apparatus) of a prior art.

As shown in FIG. 1, the optical disk control apparatus 100 includes a spindle motor 111, an optical pickup 112, a traverse motor 113, a system control part 114, a playback control part A120, an auxiliary information access control part A121, a playback-data access control part 122, a playback ID management table part 124, a playback ID storing part 125, a playback ID comparing part A126, an auxiliary information access necessity determining part A127, and an auxiliary information storage part A128. Among those mentioned above, elements denoted by the same numerals as those in FIG. 10 showing the configuration of the optical disk control apparatus of the prior art, have the same functions.

In Embodiment 1, a part of functions of the system control part 114, and functions of the playback control part A120, the auxiliary information access control part A121, the playback-data access control part 122, the playback ID comparing part A126, and the auxiliary information access necessity determining part A127 are executed by a program of a microcomputer for example.

The playback control part A120 controls the whole playback operation. The auxiliary information access control part A121 controls the access for obtaining the auxiliary information under control of the auxiliary information access control part A120. The playback-data access control part 122 controls the access for obtaining the playback data under control of the playback control part A120.

As shown in FIG. 6, the MP3 data 610, which are music data, consists of MP3 audio data 611, which is a playback data part, and an ID3 tag 612, which is the auxiliary information part added to the end of the MP3 audio data 611. That is, a set of the playback data 611 and the auxiliary information 612 is stored piece by piece of music in the contiguous region on the recording medium. The auxiliary information is bibliographic information (e.g. title name, artist name, album name or the like) excluding the information that is necessary to access the recording medium (for example, head address and recording position of the playback data and so on). There is also a case that the ID3 tag 612, which is the auxiliary information part, is added to the head of the MP3 audio data 611. In addition, a plurality of sets of the MP3 data 610 consisting of the MP3 audio data 611 and the ID3 tag 612 are recorded on the optical disk 110 in FIG. 1.

The optical disk control apparatus 100 configured as described above will be explained referring to the drawings. In the optical disk control apparatus 100 shown in FIG. 1, while the optical disk 110 is being rotated by the spindle motor 111, the optical pickup 112 is moved by the traverse motor 113. The optical pickup 112 reads out the data recorded on the optical disk 110. The system control part 114 processes the data having been read and outputs a sound L channel signal and a sound R channel signal as a playback signal. In addition, the system control part 114 executes focus servo control and tracking servo control of the optical pickup 112 when reading out the data from the optical disk 110, rotation control of the spindle motor 111 for stable rotation of the optical disk 110, and moving control of the traverse motor 113 for moving the optical pickup 112 to a destination access position on the optical disk 110.

Hereupon, when a key-inputting from outside is made, the playback control part A120 operates according to the key input. For example, when a PLAY key-inputting is made in a stopped state, the playback control part A120 instructs the playback-data access control part 122 to play a signal, and then the playback-data access control part 122 requests to the system control part 114 accessing of playback data. The system control part 114 controls the spindle motor 111 and the traverse motor 113, which are access parts, according to the request of the playback data access to move the optical pickup 112 to a destination position of the playback data on the optical disk 110. The optical pickup 112 reads out a destination playback data. The system control part 114 processed the data having been read to output the sound L channel signal and the sound R channel signal as the playback signal.

Furthermore, in the case that the auxiliary information (ID3 tag) is added to the playback data, the playback control part A120 instructs the auxiliary information access control part A121 in order to obtain the auxiliary information (ID3 tag), and then the auxiliary information access control part A121 requests to the system control part 114 accessing of the auxiliary information. The system control part 114 controls the spindle motor 111 and the traverse motor 113 according to the request of the auxiliary information access to move the optical pickup 112 to a position of the destination auxiliary information (ID3 tag) on the optical disk 110. The optical pickup 112 reads out the destination auxiliary information (ID3 tag). The playback control part A120 analyzes the auxiliary information (ID3 tag) having been read to output and displays it.

In FIG. 7, the state in which the playback data recording part 710 is arranged on the inner periphery and the auxiliary information recording part 711 is arranged on the outer periphery on the optical disk 110 driven to rotate by the spindle motor 111 is illustrated, and also the situation in which the optical pickup 112 moves to either side by the traverse motor 113 as the arrow indicates is illustrated. In FIG. 1, in the case that the above-mentioned PLAY key-inputting is made, the playback-data access control part 122 and the auxiliary information access control part A121 request to the system control part 114 accessing of playback data and an auxiliary information. In this case, the playback control part A120 is required to output and display the ID3 tag (e.g. title name or the like), which is the auxiliary information, using a display medium such as an LCD display or the like at the time of the start of playback. Therefore, as shown in FIG. 7, when playing the MP3 data, the traverse motor 113 moves the optical pickup 112 not directly to the position (1), which is the head position of the MP3 audio data recorded on the playback data recording part 710, but in the first place to a position (3) in order to obtain the ID3 tag recorded on the auxiliary information recording part 711 according to the request of the auxiliary information access. While the traverse motor 113 moves the optical pickup 112 from the position (3) to the position (4), the optical pickup 112 reads out the ID3 tag. Then, after completion of reading the ID3 tag, the traverse motor 113 puts the optical pickup 112 back to the position (1) according to the request of the playback data access so as to play the MP3 audio data recorded in the playback data recording part 710. During the while the traverse motor 113 moves the optical pickup 112 from the position (1) to the position (2), the optical pickup 112 reads out the MP3 audio data. The system control part 114 outputs the playback signal.

Here, the operation that the auxiliary information access control part A121 requests to the system control part 114 accessing of an auxiliary information will be explained in further detail. The playback control part A120 manages the playback ID management table part 124. A playback ID management table A824, which is an example of the playback ID management table 124, is shown in FIG. 8. The playback ID management table A824 is a table in which unique playback IDs (1 to N) are respectively given to a plurality of the MP3 audio data recorded on the optical disk 110, and the absolute recording positions on the optical disk 110 respectively correspond to those MP3 audio data. However, the playback IDs are not necessarily limited to be natural and consecutive numbers, and also the absolute recording positions are not always necessary. The playback control part A120 refers to such the playback ID management table A824, and the playback ID of the MP3 audio data presently being played is temporarily stored in the playback ID storing part 125 during the playback operation.

In addition, at the same time, the auxiliary information (ID3 tag) added to the MP3 audio data presently being played is stored in the auxiliary information storage part A128. At the time when the playback of the MP3 audio data presently being played is finished, the control flow proceeds to a process of playback of the next MP3 audio data. At this time, the playback ID comparing part A126 compares the playback ID of the MP3 audio data to be played next with the playback ID of the MP3 audio data played in the last time and temporarily stored in the playback ID storing part 125 earlier; and if they are identical IDs, the auxiliary information access necessity determining part A127 instructs the auxiliary information access control part A121 not to access the auxiliary information but to reuse the auxiliary information. The auxiliary information access control part A121 does not request to the system control part 114 accessing for re-obtaining the auxiliary information from the optical disk 110 but request to the auxiliary information storage part A128 in order to obtain the auxiliary information (ID3 tag) stored therein to realize the reuse of the auxiliary information (ID3 tag).

Comparison between the playback ID of the MP3 audio data to be played next and a playback ID of the MP3 audio data that are temporarily stored in the playback ID storing part 125 earlier and have been played last time is executed; if both IDs are not identical to each other, the auxiliary information access necessity determining part A127 instructs the auxiliary information access control part A121 to access the auxiliary information. The auxiliary information access control part A121 requests to the system control part 114 accessing for re-obtaining the auxiliary information from the optical disk 110.

Figure 11:
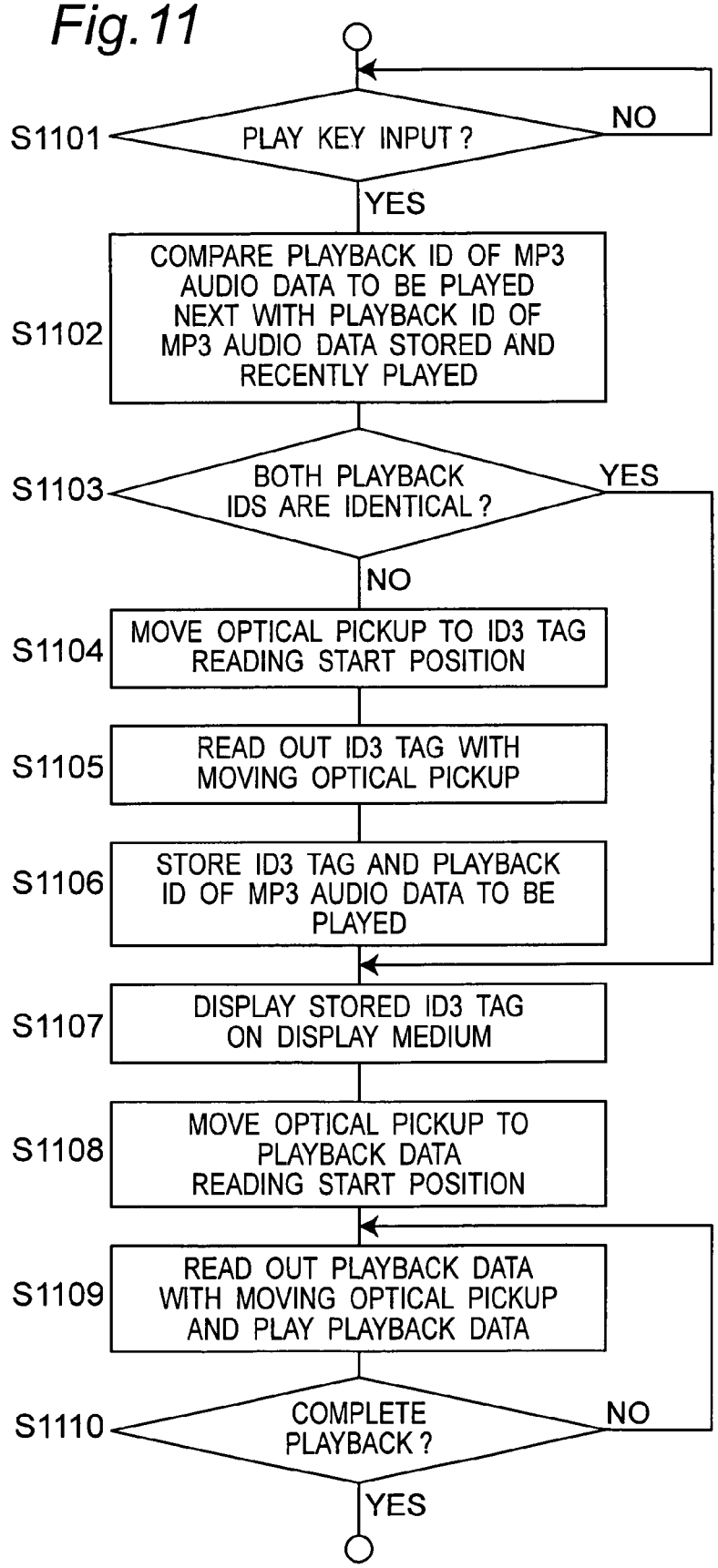
FIG. 11 is a flow chart showing an operation at the time of playback of the recording medium control apparatus in accordance with Embodiment 1 of the present invention.

In addition, the playback operation (the recording medium control method) of the recording medium control apparatus in Embodiment 1 in the case that the auxiliary information (ID3 tag) is added to the playback data is described referring to FIG. 11. FIG. 11 is a flow chart showing the playback operation of the recording medium control apparatus of Embodiment 1.

First of all, the PLAY key-inputting is checked (at step S1101), the control flow proceeds to step S1102 when the PLAY key is inputted, or returns to step S1101 when the PLAY key is not inputted.

Next, the playback ID comparing part A126 compares the playback ID of the MP3 audio data to be played next with the playback ID of the MP3 audio data played immediately before and stored in the playback ID storing part 125 (at step S1102), and checks whether or not both playback IDs are identical to each other (at step S1103). When both playback IDs are not identical to each other, the traverse motor 113 moves the optical pickup 112 to reading start position of the ID3 tag (at step S1104). While the traverse motor 113 moves the optical pickup 112, the optical pickup 112 reads out the ID3 tag of the MP3 audio data to be played next (at step S1105). The ID3 tag having been read and the playback ID of the MP3 audio data to be played are stored respectively in the auxiliary information storage part A128 and the playback ID storing part 125 (at step S1106). The control flow proceeds to step S1107. In step S1103, when both playback IDs are identical to each other, the control flow proceeds to step S1107.

Next, the playback control part A120 displays the ID3 tag stored in the auxiliary information storage part A128 onto the display medium (at step S1107). The traverse motor 113 moves the optical pickup 112 to the playback data reading start position (at step S1108). The optical pickup 112 reads out the playback data. The system control part 114 outputs the playback data (at step S1109). Examining whether or not the playback is completed (at step S1110), the control flow terminates if the playback is completed; and the control flow returns to step S1109 and continues to read out and output the playback data if the playback is not completed.

As described above, in the recording medium control apparatus and the recording medium control method in Embodiment 1, in the case that the MP3 audio data that have been played last time are again played, the amount of displacement of the optical pickup is small, and the power consumption is low.

Embodiment 2

Figure 2:
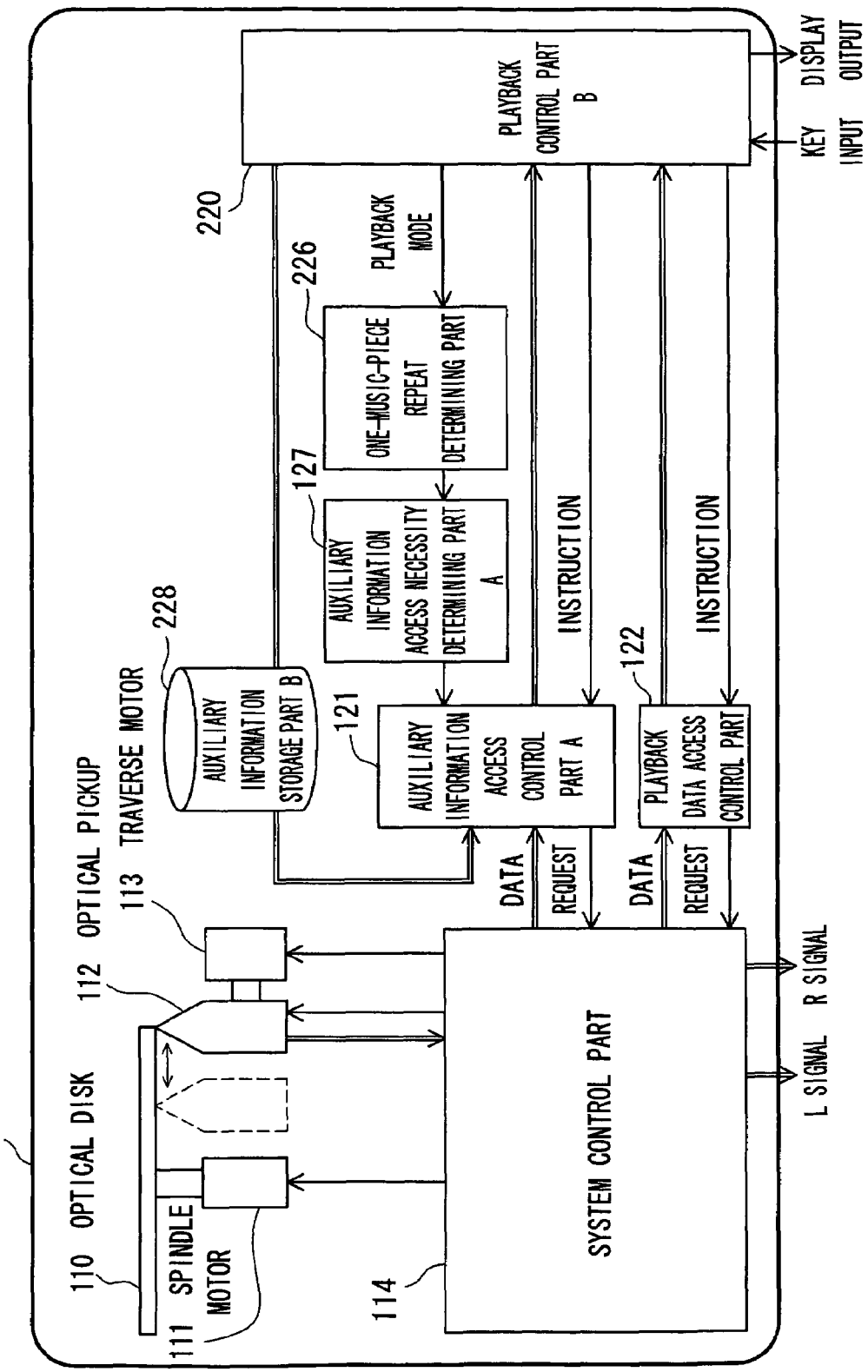
FIG. 2 is a block diagram showing a configuration of a recording medium control apparatus in accordance with Embodiment 2 of the present invention.

A recording medium control apparatus and a recording medium control method embodied in Embodiment 2 of the present invention will be explained referring to the drawings. FIG. 2 is a block diagram showing a configuration of an optical disk control apparatus of Embodiment 2 of the present invention; and the above-described FIGS. 6 and 7 are also referred to explain.

As shown in FIG. 2, the optical disk control apparatus 200 includes the spindle motor 111, the optical pickup 112, the traverse motor 113, the system control part 114, a playback control part B220, the auxiliary information access control part A121, the playback-data access control part 122, a one-music-piece repeat determining part 226, the auxiliary information access necessity determining part A127, and an auxiliary information storage part B228. Blocks having the same functions as those in Embodiment 1 are denoted by the same numerals.

In Embodiment 2, a part of function of system control part 114, and functions of the playback control part B220, the auxiliary information access control part A121, the playback-data access control part 122, the auxiliary information access necessity determining part A127 and the one-music-piece repeat determining part 226 are executed by a program of a microcomputer for example.

The playback control part B220 controls the whole playback operation. The auxiliary information access control part A121 controls the access to obtain the auxiliary information under control of the playback control part B220. The playback-data access control part 122 controls the access to obtain playback data under control of the playback control part B220.

A plurality of sets of the MP3 audio data 610 consisting of the MP3 audio data 611 and the ID3 tag 612 shown in FIG. 6 is recorded on the optical disk 110 shown in FIG. 2.

The optical disk control apparatus 200 configured as described above will be explained referring to the drawings. As shown in FIG. 2, while the optical disk control apparatus 200 is rotating the optical disk 110 by the spindle motor 111, the optical pickup 112 is moved by the traverse motor 113.

The optical pickup 112 reads out the data recorded on the optical disk 110. The system control part 114 processes the data having been read and outputs the sound L channel signal and the sound R channel signal as the playback signal. In addition, the system control part 114 executes focus servo control and tracking servo control of the optical pickup 112 when reading out the data from the optical disk 110, rotation control of the spindle motor 111 for stable rotation of the optical disk 110, and rotation control of the traverse motor 113 for moving the optical pickup 112 to a destination access position on the optical disk 110.

Hereupon, when a key-inputting from outside is made, the playback control part B220 operates according to the key input. For example, when a PLAY key-inputting is made in a stopped state, the playback control part B220 instructs the playback-data access control part 122 to play a signal, and then the playback-data access control part 122 requests to the system control part 114 accessing of playback data. The system control part 114 controls the spindle motor 111 and the traverse motor 113 according to the request of the playback data access to move the optical pickup 112 to the destination position of the playback data on the optical disk 110. The optical pickup 112 reads out the destination playback data. The system control part 114 processes the data having been read and outputs the sound L channel signal and the sound R channel signal as the playback signal.

Furthermore, in the case that the auxiliary information (ID3 tag) is added to the playback data, the playback control part B220 instructs the auxiliary information access control part A121 in order to obtain the auxiliary information (ID3 tag), and then the auxiliary information access control part A121 requests to the system control part 114 accessing of the auxiliary information. The system control part 114 controls the spindle motor 111 and the traverse motor 113 according to the request of the auxiliary information access to move the optical pickup 112 to a position of the destination auxiliary information (ID3 data) on the optical disk 110. The optical pickup 112 reads out the destination auxiliary information (ID3 tag). The playback control part B220 analyzes the auxiliary information (ID3 tag) having been read to output and displays it.

In FIG. 2, in the case that the above-mentioned PLAY key-inputting is made, the playback-data access control part 122 and the auxiliary information access control part A121 request to the system control part 114 accessing of playback data and an auxiliary information; but since the playback control part B220 is required to output and display the ID3 tag (e.g. title name or the like), which is the auxiliary information, at the time of start of playback, the traverse motor 113 moves the optical pickup 112 not directly to the position (1), which is the head position of the MP3 audio data recorded on the playback data recording part 710, but in the first place to the position (3) in order to obtain the ID3 tag recorded on the auxiliary information recording part 711 according to the request of the auxiliary information access when playing the MP3 data, as shown in FIG. 7. While the traverse motor 113 moves the optical pickup 112 from the position (3) to the position (4), the optical pickup 112 reads out the ID3 tag. Then, after completion of reading of the ID3 tag, the traverse motor 113 puts the optical pickup 112 back to the position (1) according to the request of the playback data access so as to play the MP3 audio data recorded on the playback data recording part 710. During the while the traverse motor 113 moves the optical pickup 112 from the position (1) to the position (2), the optical pickup 112 reads out the MP3 audio data. The system control part 114 outputs the playback signal.

Here, the operation that the auxiliary information access control part A121 requests to the system control part 114 accessing of auxiliary information will be explained in further detail. The playback control part B220 can control the order of playback (playback modes) by means of the key input or some other means. The term the playback modes here represent, for example: "one-music-piece repeat" for playing repeatedly only one-piece of music of MP3 audio data, "all-music-piece repeat" for playing repeatedly all the pieces of music of MP3 audio data recoded on the optical disk 110, "random" for playing in random order all the pieces of music of MP3 audio data recorded on an optical disk 110, and "random repeat" for playing repeatedly in random order all the pieces of music of MP3 audio data recorded on the optical disk 110, and so on. The playback control part B220 operates according to such the playback modes as mentioned above. During the playback operation, the auxiliary information (ID3 tag) added to the MP3 audio data presently being played is stored in the auxiliary information storage part B228. In addition, at the time when the playback of the MP3 audio data presently being played is finished, the control flow proceeds to a process of the playback of next MP3 audio data. At this time, the one-music-piece repeat determining part 226 determines whether or not the playback mode is the one-music-piece repeat for playing repeatedly the data presently being played. If the playback mode is the one-music-piece repeat, the auxiliary information access necessity determining part A127 instructs the auxiliary information access control part A121 not to access the auxiliary information but to reuse the auxiliary information. The auxiliary information access control part A121 does not request to the system control part 114 accessing for re-obtaining the auxiliary information from the optical disk 110 but request to the auxiliary information storage part B228 in order to obtain the auxiliary information (ID3 tag) stored therein to realize the reuse of the auxiliary information (ID3 tag).

If the playback mode is not the one-music-piece repeat, the auxiliary information access necessity determining part A127 instructs the auxiliary information access control part A121 to access the auxiliary information. The auxiliary information access control part A121 requests to the system control part 114 accessing for re-obtaining the auxiliary information from the optical disk 110.

Figure 12:
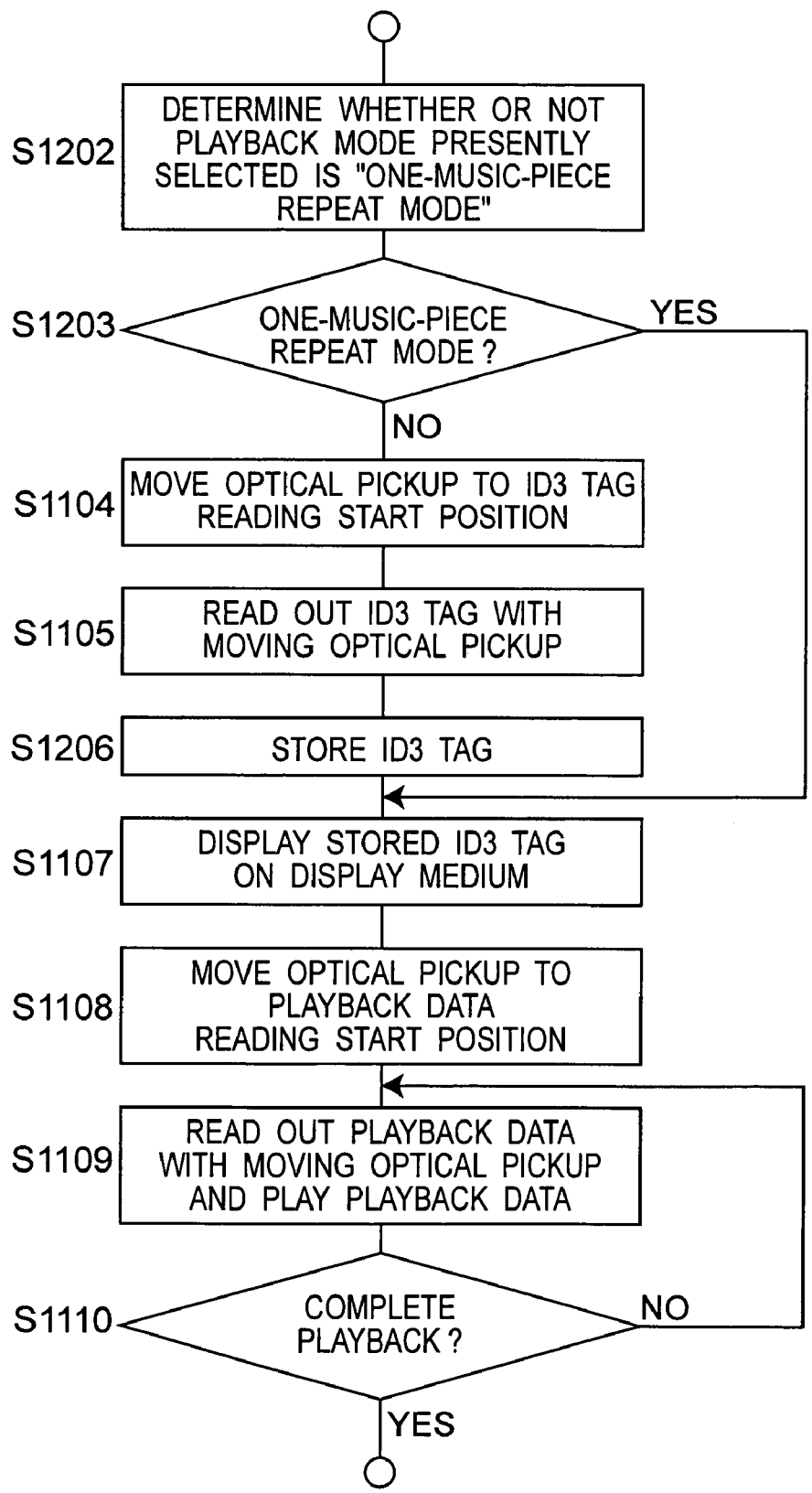
FIG. 12 is a flow chart showing an operation at the time of playback of the recording medium control apparatus in accordance with Embodiment 2 of the present invention.

The playback operation of the recording medium control apparatus of Embodiment 2 in the case that the auxiliary information (ID3 tag) is added to the playback data is described referring to FIG. 12. FIG. 12 is a flow chart showing the playback operation of the recording medium control apparatus of Embodiment 2.

A flow chart of FIG. 12 is different from that of FIG. 11 in the point that it has steps S1202, S1203, and S1206 instead of steps S1102, S1103, and S1106, and step S1101 is removed. In other respects, they are similar to those of FIG. 11.

At the time of the playback of the next peace of music, the one-music-piece repeat determining part 226 determines whether or not the playback mode presently selected is "one-piece of music repeat mode" (at step S1202), and checks whether or not the playback mode presently selected is "one-music-piece repeat mode" (at step S1203). When the playback mode presently selected is not "one-music-piece repeat mode", the traverse motor 113 moves the pickup 112 to the ID3 tag reading start position (at step S1104). While the traverse motor 113 moves the optical pickup 112, the optical pickup 112 reads out the ID3 tag of the MP3 audio data to be played next (at step S1105). The ID3 tag having been read is stored in the auxiliary information storage part B228 (at step S1206). Then, the control flow proceeds to step S1107.

In step S1203, when the playback mode presently selected is "one-music-piece repeat mode", the control flow proceeds to step S1107. Since steps following step S1107 are the same as those of FIG. 11, their descriptions are omitted.

As described above, in the recording medium control apparatus in Embodiment 2, in the case that the MP3 audio data that have been played last time are again played, the amount of displacement of the optical pickup is small, and the power consumption is low.

Embodiment 3

Figure 3:
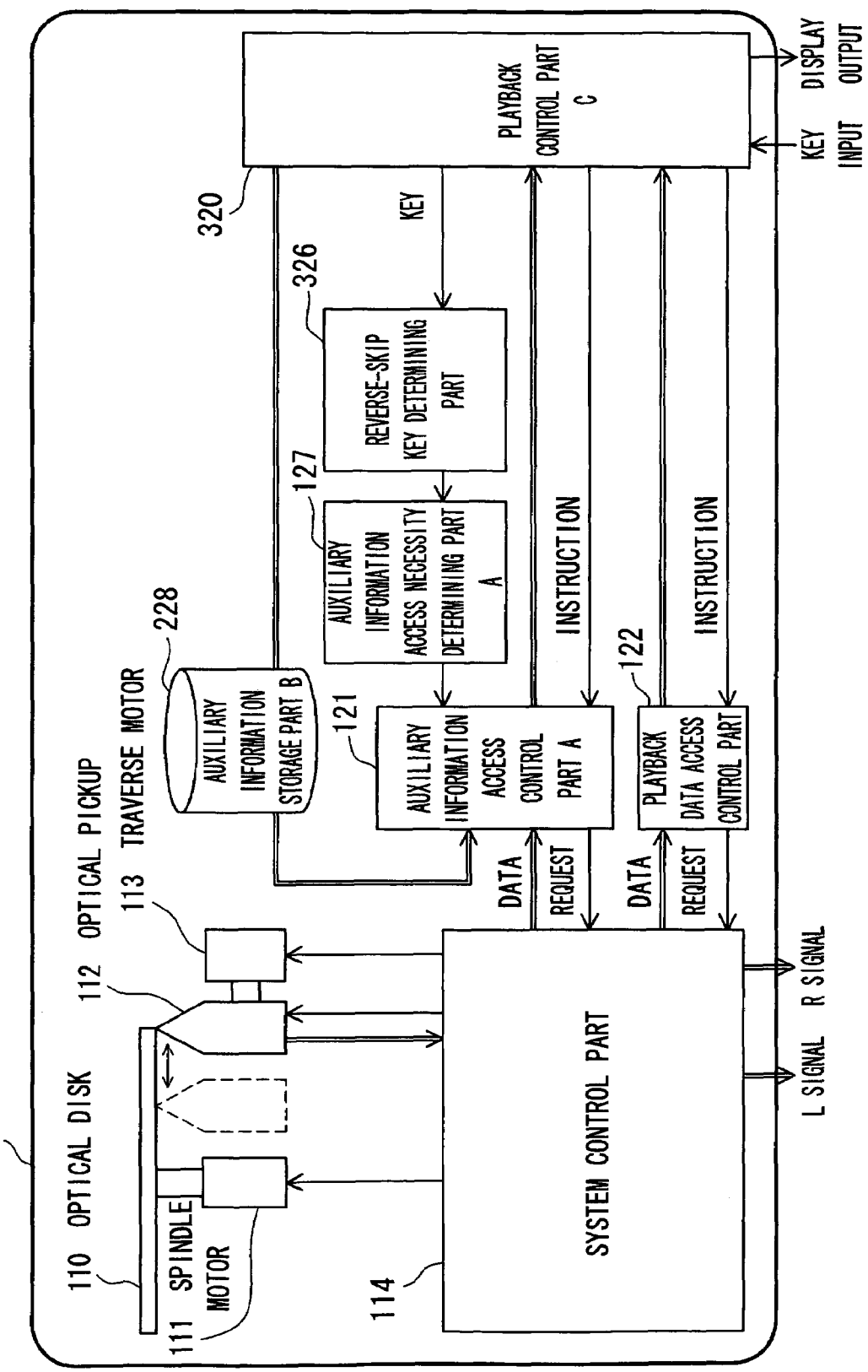
FIG. 3 is a block diagram showing a configuration of a recording medium control apparatus in accordance with Embodiment 3 of the present invention.

A recording medium control apparatus and a recording medium control method embodied in Embodiment 3 of the present invention will be explained referring to the drawings. FIG. 3 is a block diagram showing a configuration of an optical disk control apparatus of Embodiment 3 of the present invention; and the above-described FIGS. 6 and 7 are also referred to explain.

As shown in FIG. 3, the optical disk control apparatus 300 includes the spindle motor 111, the optical pickup 112, the traverse motor 113, the system control part 114, a playback control part C320, the auxiliary information access control part A121, the playback-data access control part 122, a REVERSE-SKIP key determining part 326, the auxiliary information access necessity determining part A127, and the auxiliary information storage part B228. Blocks having the same functions as those in the above-mentioned Embodiments are denoted by the same numerals.

In Embodiment 3, a part of the function of system control part 114, functions of the playback control part C320, the auxiliary information access control part A121, the playback-data access control part 122, auxiliary information access necessity determining part A127, and REVERSE-SKIP key determining part 326 are executed by a program of a microcomputer for example.

The playback control part C320 controls the whole playback operation. The auxiliary information access control part A121 controls the access to obtain the auxiliary information under control of the playback control part C320. The playback-data access control part 122 controls the access to obtain playback data under control of the playback control part C320.

A plurality of sets of the MP3 data 610 consisting of the MP3 audio data 611 and the ID3 tag 612 shown in FIG. 6 is recorded on the optical disk 110 in FIG. 3.

The optical disk control apparatus 300 configured as described above will be explained referring to the drawings. FIG. 3 shows the configuration of the optical disk control apparatus 300. While the optical disk 110 is being rotated by the spindle motor 111, the optical pickup 112 is moved by the traverse motor 113. The optical pickup 112 reads out the data recorded on the optical disk 110. The system control part 114 processes the data having been read and outputs the sound L channel signal and the sound R channel signal as the playback signal. In addition, the system control part 114 executes focus servo control and tracking servo control of the optical pickup 112 when reading out the data from the optical disk 110, rotation control of the spindle motor 111 for stable rotation of the optical disk 110, and rotation control of the traverse motor 113 for moving the optical pickup 112 to a destination access position on the optical disk 110.

Hereupon, when a key-inputting from outside is made, the playback control part C320 operates according to the key input. For example, when a PLAY key-inputting is made in a stopped state, the playback control part C320 instructs the playback-data access control part 122 to play a signal, and then the playback-data access control part 122 requests to the system control part 114 accessing of the playback data. The system control part 114 controls the spindle motor 111 and the traverse motor 113 according to the request of the playback data access to move the optical pickup 112 to the destination position of the playback data on the optical disk 110. The optical pickup 112 reads out the destination playback data. The system control part 114 processes the data having been read and outputs the sound L channel signal and the sound R channel signal as the playback signal.

Furthermore, in the case that the auxiliary information (ID3 tag) is added to the playback data, the playback control part C320 instructs the auxiliary information access control part A121 in order to obtain the auxiliary information (ID3 tag), and then the auxiliary information access control part A121 requests to the system control part 114 accessing of the auxiliary information. The system control part 114 controls the spindle motor 111 and the traverse motor 113 according to the request of the auxiliary information access to move the optical pickup 112 to a position of the destination auxiliary information (ID3 tag) on the optical disk 110. The optical pickup 112 reads out the destination auxiliary information (ID3 tag). The playback control part C320 analyzes the auxiliary information (ID3 tag) having been read to output and displays it.

In FIG. 3, in the case that the above-mentioned PLAY key-inputting is made, the playback-data access control part 122 and the auxiliary information access control part A121 request to the system control part 114 accessing of playback data and an auxiliary information. In this case, the playback control part C320 is required to output and display the ID3 tag (e.g. title name or the like), which is the auxiliary information, at the time of start of playback. Therefore, the traverse motor 113 moves the optical pickup 112 not directly to the position (1), which is the head position of the MP3 audio data recorded on the playback data recording part 710, but in the first place to the position (3) in order to obtain the ID3 tag recorded on the auxiliary information recording part 711 according to the request of the auxiliary information access when playing the MP3 data, as shown in FIG. 7. While the traverse motor 113 moves the optical pickup 112 from the position (3) to the position (4), the optical pickup 112 reads out the ID3 tag. Then, after completion of reading of the ID3 tag, the traverse motor 113 puts the optical pickup 112 back to the position (1) according to the request of the playback data access so as to play the MP3 audio data recorded on the playback data recording part 710. While the traverse motor 113 moves the optical pickup 112 from the position (1) to the position (2), the optical pickup 112 reads out the MP3 audio data. The system control part 114 outputs the playback signal.

Here, the operation that the auxiliary information access control part A121 requests to the system control part 114 accessing of an auxiliary information, will be explained in further detail. The playback control part C320 can control the playback positions by means of the key input or some other means. The term the playback positions here are decided by means of the key input or some other means, such as "a PLAY key" for making the optical disk control apparatus 300 to start the playback from the head position of a certain playback data, "a FORWARD-SKIP key" for making transition from an MP3 audio data presently being played to the playback operation of the next MP3 audio data, "a REVERSE-SKIP key" for making transition to operation for resuming the playback from the head (or intermediate) position of an MP3 audio data presently being played, or the like. The playback control part C320 operates according to the key inputs or other means for deciding the playback position. During the playback operation, the auxiliary information (ID3 tag) added to the MP3 audio data presently being played is stored in an auxiliary information storage part B228. In addition, in case for example, any key input (or input from some other means) is occurred, the playback control part C320 changes the operation state according to the key input (or the input from some other means). At this time, the REVERSE-SKIP key determining part 326 determines whether or not the instruction type of the key input (or the input from some other means) is a REVERSE-SKIP key for resuming the playback from the head of data presently being played or from some position prior to the position at which the playback is presently being performed. If the instruction type of the key input is a REVERSE-SKIP key, the auxiliary information access necessity determining part A127 instructs the auxiliary information access control part A121 not to access the auxiliary information but to reuse the auxiliary information. The auxiliary information access control part A121 does not request to the system control part 114 accessing for re-obtaining the auxiliary information from the optical disk 110 but request to the auxiliary information storage part B228 in order to obtain the auxiliary information (ID3 tag) stored therein to realize the reuse of the auxiliary information (ID3 tag).

If the instruction type of the key input is not REVERSE-SKIP key, the auxiliary information access necessity determining part A127 instructs the auxiliary information access control part A121 to access the auxiliary information. The auxiliary information access control part A121 requests to the system control part 114 accessing for re-obtaining the auxiliary information from the optical disk 110.

Figure 13:
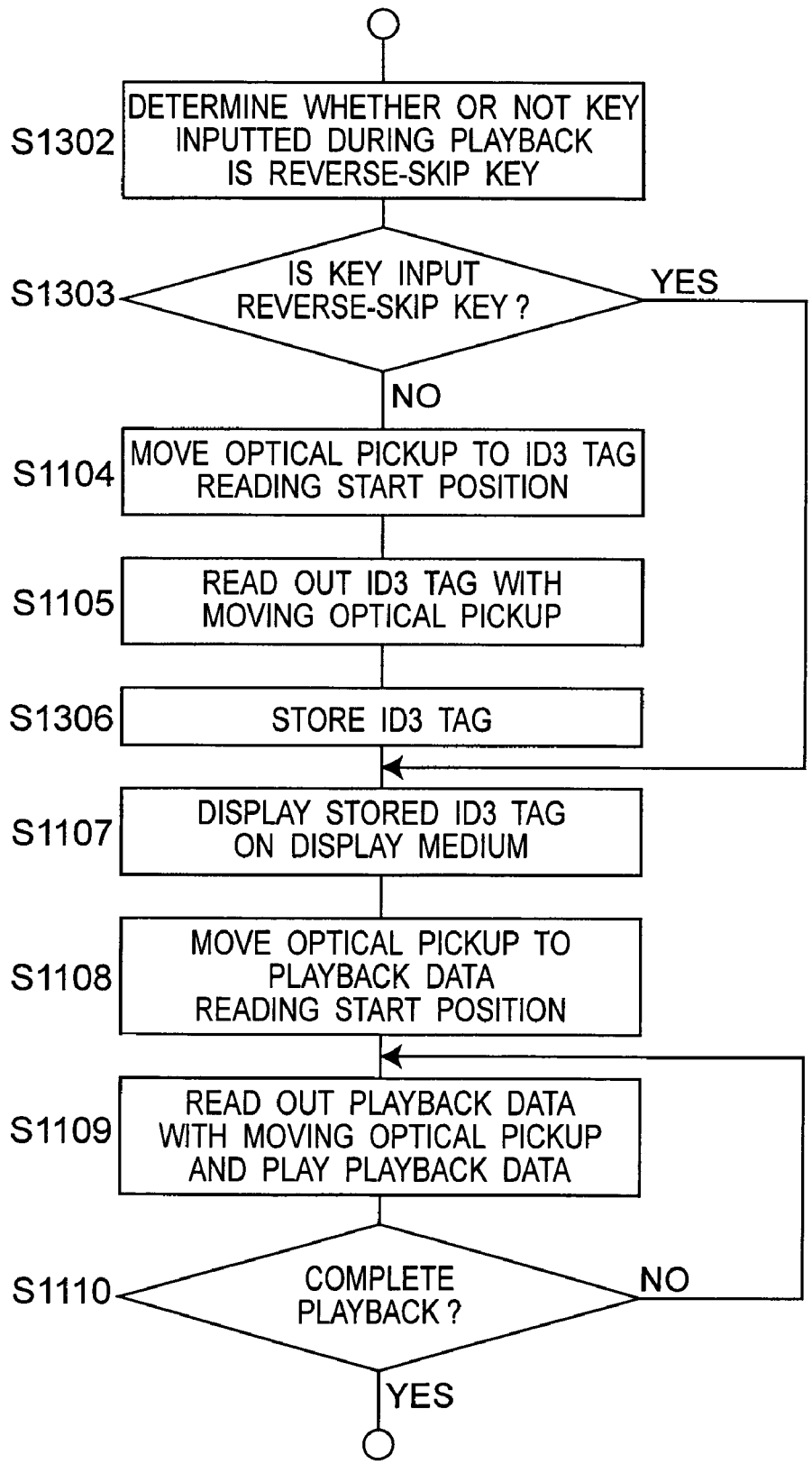
FIG. 13 is a flow chart showing an operation at the time of playback of the recording medium control apparatus in accordance with Embodiment 3 of the present invention.

In the case that the auxiliary information (ID3 tag) is added to the playback data, the playback operation (recording medium control method) of the recording medium control apparatus of Embodiment 3 is described referring to FIG. 13. FIG. 13 is a flow chart showing the playback operation of the recording medium control apparatus of Embodiment 3.

The flow chart of FIG. 13 is different from that of FIG. 11 in the point that it has steps S1302, S1303, and S1306 instead of steps S1102, S1103, and S1106 and step S1101 is removed. In other respects, they are similar to those of FIG. 11.

In the case that a key-inputting is made during the playback, the REVERSE-SKIP key determining part 326 determines whether or not the inputted key is "REVERSE-SKIP key" (at step S1302), and checks whether or not the inputted key is "REVERSE-SKIP key" (at step S1303). When the key is not "REVERSE-SKIP key", the traverse motor 113 moves the optical pickup 112 to the ID3 tag reading start position (at step S1104). While the traverse motor 113 moves the optical pickup 112, the optical pickup 112 reads out the ID3 tag of the MP3 audio data to be played next (at step S1105). The ID3 tag having been read is stored in the auxiliary information storage part B228 (at step S1306). Then, the control flow proceeds to step S1107.

In step S1303, when the inputted key is "REVERSE-SKIP key", the control flow proceeds to step S1107. Since steps following step S1107 are the same as those of FIG. 11, their descriptions are omitted.

As described above, in the recording medium control apparatus in Embodiment 3, in the case that the MP3 audio data that have been played last time are again played, the amount of displacement of the optical pickup is small, and the power consumption is low.

Embodiment 4

Figure 4:
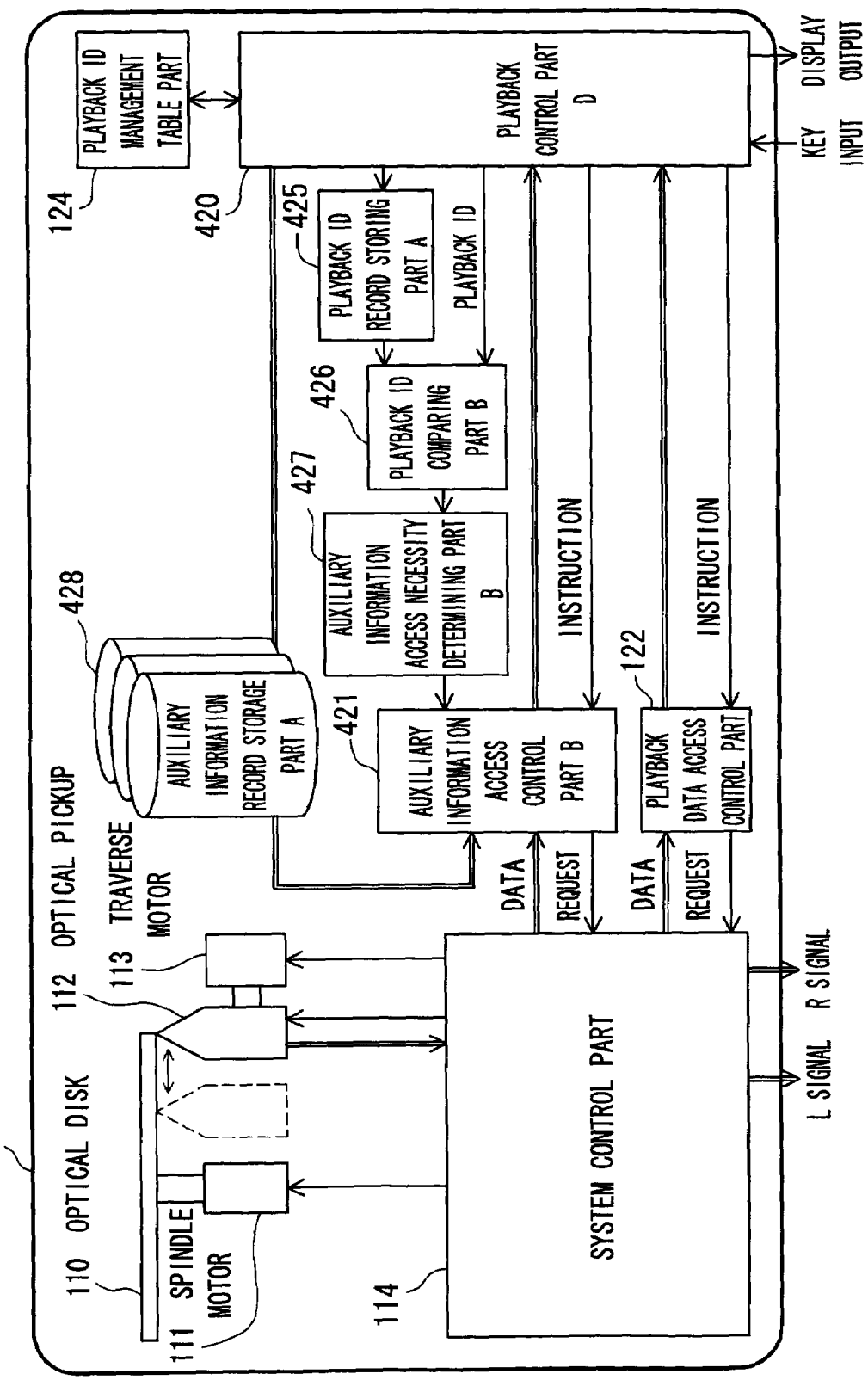
FIG. 4 is a block diagram showing a configuration of a recording medium control apparatus in accordance with Embodiment 4 of the present invention.

A recording medium control apparatus and a recording medium control method embodied in Embodiment 4 of the present invention will be explained referring to the drawings. FIG. 4 is a block diagram showing a configuration of an optical disk control apparatus of Embodiment 3 of the present invention, and FIG. 9 is a diagram showing an example of a playback ID management table; and the above-described FIGS. 6, 7 and 8 are also referred to explain.

As shown in FIG. 4, the optical disk control apparatus 400 includes the spindle motor 111, the optical pickup 112, the traverse motor 113, the system control part 114, a playback control part D420, an auxiliary information access control part B421, the playback-data access control part 122, the playback ID management table part 124, a playback ID record storing part A425, a playback ID comparing part B426, an auxiliary information access necessity determining part B427, and an auxiliary information record storage part A428. Blocks having the same functions as those in the above-mentioned Embodiments are denoted by the same numerals.

In Embodiment 4, a part of functions of the system control part 114 and the playback control part D420, functions of the auxiliary information access control part B421, the playback-data access control part 122, the auxiliary information access necessity determining part B427 and the playback ID comparator part B426 are executed by a program of a microcomputer for example.

The playback control part D420 controls the whole playback operation. The auxiliary information access control part B421 controls the access to obtain the auxiliary information under control of the playback control part D420. The playback-data access control part 122 controls the access to obtain playback data under control of the playback control part D420.

A plurality of sets of the MP3 data 610 consisting of the MP3 audio data 611 and the ID3 tag 612 shown in FIG. 6 is recorded on the optical disk 110 in FIG. 4.

The optical disk control apparatus 400 configured as described above will be explained referring to the drawings. As shown in FIG. 4, while the optical disk control apparatus 400 is rotating the optical disk 110 by the spindle motor 111, the optical pickup 112 is moved by the traverse motor 113. The optical pickup 112 reads out the data recorded on the optical disk 110. The system control part 114 processes the data having been read and outputs the sound L channel signal and the sound R channel signal as the playback signal. In addition, the system control part 114 executes focus servo control and tracking servo control of the optical pickup 112 when reading out the data from the optical disk 110, rotation control of the spindle motor 111 for stable rotation of the optical disk 110, and rotation control of the traverse motor 113 for moving the optical pickup 112 to a destination access position on the optical disk 110.

Hereupon, when a key-inputting from outside is made, the playback control part D420 operates according to the key input. For example, when a PLAY key-inputting is made in a stopped state, the playback control part D420 instructs the playback-data access control part 122 to play a signal, and then the playback-data access control part 122 requests to the system control part 114 accessing of the playback data. The system control part 114 controls the spindle motor 111 and the traverse motor 113 according to the request of the playback data access to move the optical pickup 112 to the destination position of the playback data on the optical disk 110. The optical pickup 112 reads out the destination playback data. The system control part 114 processes the data having been read and outputs the sound L channel signal and the sound R channel signal as the playback signal.

Furthermore, in the case that the auxiliary information (ID3 tag) is added to the playback data, the playback control part D420 instructs the auxiliary information access control part B421 in order to obtain the auxiliary information (ID3 tag), and then the auxiliary information access control part B421 requests to the system control part 114 accessing of the auxiliary information. The system control part 114 controls the spindle motor 111 and the traverse motor 113 according to the request of the auxiliary information access to move the optical pickup 112 to a position of the destination auxiliary information (ID3 data) on the optical disk 110. The optical pickup 112 reads out the destination auxiliary information (ID3 tag). The playback control part D420 analyzes the auxiliary information (ID3 tag) having been read to output and displays it.

In FIG. 4, in the case that the above-mentioned PLAY key-inputting is made, the playback-data access control part 122 and the auxiliary information access control part B421 request to the system control part 114 accessing of playback data and an auxiliary information. In this case, the playback control part D420 is required to output and display the ID3 tag (e.g. title name or the like), which is the auxiliary information, at the time of start of playback. Therefore, the traverse motor 113 moves the optical pickup 112 not directly to the position (1), which is the head position of the MP3 audio data recorded on the playback data recording part 710, but rather to the position (3) in order to obtain the ID3 tag recorded on the auxiliary information recording part 711 according to the request of the auxiliary information access when playing an MP3 data, as shown in FIG. 7. While the traverse motor 113 moves the optical pickup 112 from the position (3) to the position (4), the optical pickup 112 reads out the ID3 tag. Then, after completion of reading of the ID3 tag, the traverse motor 113 puts the optical pickup 112 back to the position (1) according to the request of the playback data access so as to play the MP3 audio data recorded on the playback data recording part 710. While the traverse motor 113 moves the optical pickup 112 from the position (1) to the position (2), the optical pickup 112 reads out the MP3 audio data. The system control part 114 outputs the playback signal.

Here, the operation that the auxiliary information access control part B421 requests to the system control part 114 accessing of an auxiliary information will be explained in further detail. The playback control part D420 manages the playback ID management table part 124. The playback management table A824, which is an example of the playback ID management table 124 shown in FIG. 4, is a table in which unique playback IDs (1 to N) are respectively given to a plurality of the MP3 audio data recorded on the optical disk 110, and the absolute recording positions on the optical disk 110 respectively correspond to those MP3 audio data. However, the playback IDs are not necessarily limited to be natural and consecutive numbers, and also the absolute recording positions are not always necessary. The playback control part D420 refers to such the playback ID management table A824, and all of (or finite number of) the playback IDs of the MP3 audio data played so far are temporarily stored in the playback ID record storing part A425 during the playback operation. In addition, at the same time, the auxiliary information (ID3 tags) added to all of (or finite number of) the MP3 audio data played so far are stored in the auxiliary information record storage part A428 keeping the correspondence with the playback IDs. Next, when the playback of the MP3 audio data presently being played is finished, the control flow proceeds to a process of playback of the next MP3 audio data. At this time, the playback ID comparing part B426 compares the playback ID of the MP3 audio data to be played next with the playback IDs of all of (or finite number of) the MP3 audio data played so far and temporarily stored in the auxiliary information record storing part A425. If they are identical IDs, the auxiliary information access necessity determining part B427 instructs the auxiliary information control part B421 not to access the auxiliary information but to reuse the auxiliary information together with the playback IDs. The auxiliary information access control part B421 does not request to the system control part 114 accessing for re-obtaining the auxiliary information from the optical disk 110 but request to the auxiliary information record storage part A428 for obtaining the specified auxiliary information (ID3 tag) among the auxiliary information (ID3 tag) stored therein to realize the reuse of the auxiliary information (ID3 tag).

Comparison between the playback ID of the MP3 audio data to be played next and all of the playback IDs of the MP3 audio data temporarily stored in the playback ID record storing part A425 earlier is executed; if they are not identical IDs, the auxiliary information access necessity determining part B427 instructs the information access control part B421 to access the auxiliary information. The auxiliary information access control part B421 requests to the system control part 114 accessing for re-obtaining the auxiliary information from the optical disk 110.

Hereupon, in FIG. 9, the playback ID management table B924, which is an example of the playback ID management table 124, is shown. The playback ID management table B924 is a table in which each unique optical disk ID (1 to M) is given to each optical disk so as to identify the optical disk 110, unique playback IDs (1 to N) on the optical disk 110 are respectively given to a plurality of MP3 audio data recorded on the optical disk 110, and also the absolute recording positions on the optical disk 110 respectively correspond to those MP3 audio data. However, the optical disk IDs and the playback IDs are not limited to be natural and consecutive numbers; and the absolute recording positions are not always necessary. As described above, by managing not only the playback ID but also the optical disk ID, and at the same time, by processing in a similar way using a pair of an optical disk ID and a playback ID as a playback ID at the playback ID record storing part A425, the playback ID comparing part B426, and the auxiliary information record storage part A428, the above-mentioned process can be realized astride a plurality of the optical disks.

The playback operation of the recording medium control apparatus of Embodiment 4, in the case that the auxiliary information (ID3 tag) is added to the playback data, is described referring to FIG. 14. FIG. 14 is a flow chart showing the playback operation of the recording medium control apparatus of Embodiment 4.

A flow chart of FIG. 14 is different from that of FIG. 11 in the point that it has steps S1402, S1403, and S1406 instead of steps S1102, S1103, and S1106. In other respects, they are similar to those of FIG. 11.

In the case that the PLAY key-inputting is made, the playback ID comparing part B426 compares the playback ID of the MP3 audio data to be played next with all of the playback ID which are stored in the playback ID record storing part A425 (at step S1402), and checks whether or not an identical playback ID is present (at step S1403). When there are no identical playback IDs, the traverse motor 113 moves the optical pickup 112 to the ID3 tag reading start position (at step S1104). While the traverse motor 113 moves the optical pickup 112, the optical pickup 112 reads out the ID3 tag of the MP3 audio data to be played next (at step S1105). The ID3 tag having been read and the playback ID of the MP3 audio data to be played are stored in the auxiliary information record storage part A428 and the playback ID record storing part 425, respectively (at step S1406). Then, the control flow proceeds to step S1107. In step S1403, when there is an identical playback ID, the control flow proceeds to step S1107. Since steps following step S1107 are the same as those of FIG. 11, their descriptions are omitted.

As described above, in the recording medium control apparatus in Embodiment 4, in the case that the MP3 audio data that have been played last time are again played, the amount of displacement of the optical pickup is small, and hence the power consumption is low.

Embodiment 5

Figure 5:
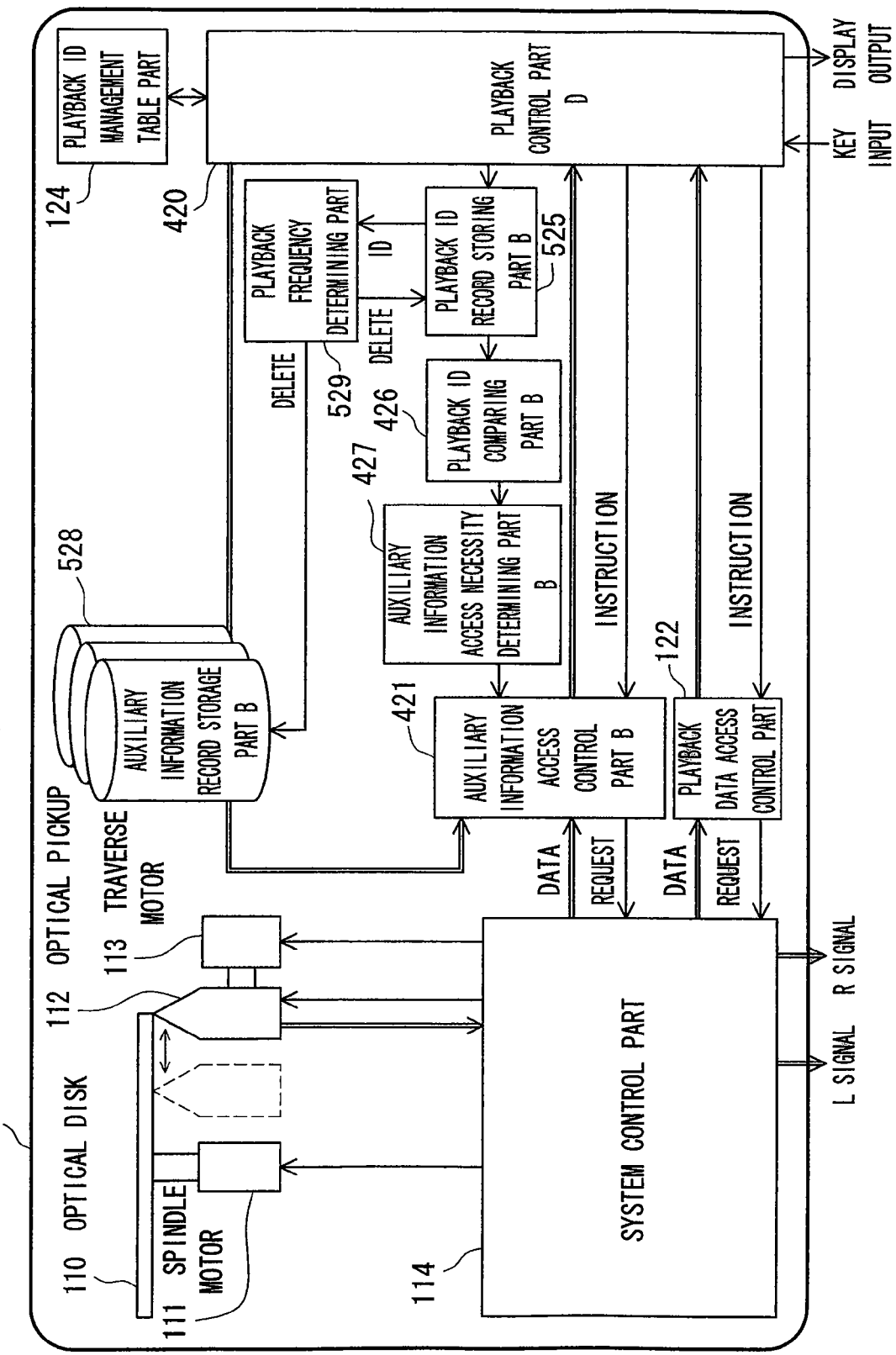
FIG. 5 is a block diagram showing a configuration of a recording medium control apparatus in accordance with Embodiment 5 of the present invention.

A recording medium control apparatus and a recording medium control method embodied in Embodiment 5 of the present invention will be explained referring to the drawings. FIG. 5 is a block diagram showing a configuration of an optical disk control apparatus of Embodiment 5 of the present invention; and the above-described FIGS. 6, 7 and 8 are also referred to explain.

As shown in FIG. 5, the optical disk control apparatus 500 includes the spindle motor 111, the optical pickup 112, the traverse motor 113, the system control part 114, the playback control part D420, the auxiliary information access control part B421, the playback-data access control part 122, the playback ID management table part 124, a playback ID record storing part B525, the playback ID comparing part B426, the auxiliary information access necessity determining part B427, an auxiliary information record storage part B528, and a playback frequency determining part 529.

In Embodiment 5, a part of functions of the system control part 114 and the playback control part D420, and functions of the auxiliary information access control part B421, the playback-data access control part 122, the auxiliary information access necessity determining part B427, the playback ID comparing part B426, and the playback frequency determining part 529 are executed by a program of a microcomputer, for example.

The playback control part D420 controls the whole playback operation. The auxiliary information access control part B421 controls the access to obtain the auxiliary information under control of the playback control part D420. The playback-data access control part 122 controls the access to obtain the playback data under control of the playback control part D420.

A plurality of sets of MP3 audio data 610 comprised of MP3 audio data 611 and ID3 tag 612 shown in FIG. 6 is recorded on the optical disk 110 in FIG. 5.

The optical disk control apparatus 500 configured as described above will be explained referring to the drawings. FIG. 5 shows the configuration of the optical disk control apparatus 500. While the optical disk control apparatus 500 is rotating the optical disk 110 by the spindle motor 111, the optical pickup 112 is moved by the traverse motor 113. The optical pickup 112 reads out the data recorded on the optical disk 110. The system control part 114 processes the data having been read and outputs the sound L channel signal and the sound R channel signal as the playback signal. In addition, the system control part 114 executes focus servo control and tracking servo control of the optical pickup 112 when reading out the data on the optical disk 110, rotation control of the spindle motor 111 for stable rotation of the optical disk 110, and rotation control of the traverse motor 113 for moving the optical pickup 112 to a destination access position on the optical disk 110.

Hereupon, when a key-inputting from outside is made, the playback control part D420 operates according to the key input. For example, when a PLAY key-inputting is made in a stopped state, the playback control part D420 instructs the playback-data access control part 122 to play a signal, and then the playback-data access control part 122 requests to the system control part 114 accessing of playback data. The system control part 114 controls the spindle motor 111 and the traverse motor 113 according to the request of the playback data access to move the optical pickup 112 to the destination position of the playback data on the optical disk 110. The optical pickup 112 reads out the destination playback data. The system control part 114 processes the data having been read and outputs the sound L channel signal and the sound R channel signal as the playback signal. Furthermore, in the case that the auxiliary information (ID3 tag) is added to the playback data, the playback control part D420 instructs the auxiliary information access control part B421 in order to obtain auxiliary information (ID3 tag), and then the auxiliary information access control part B421 requests to the system control part 114 accessing of the auxiliary information. The system control part 114 controls the spindle motor 111 and the traverse motor 113 according to the request of the auxiliary information access to move the optical pickup 112 to a position of the destination auxiliary information (ID3 tag) on the optical disk 110. The optical pickup 112 reads out the destination auxiliary information (ID3 tag). The playback control part D420 analyzes the auxiliary information (ID3 tag) having been read to output and displays it.

In FIG. 5, in the case that the above-mentioned PLAY key-inputting is made, the playback-data access control part 122 and the auxiliary information access control part B421 request to the system control part 114 accessing of playback data and an auxiliary information. The playback control part D420 is required to output and display the ID3 tag (e.g. title name or the like), which is the auxiliary information, at the time of start of playback. The traverse motor 113 moves the optical pickup 112 not directly to the position (1), which is the head position of the MP3 audio data recorded on the playback data recording part 710, but rather to the position (3) in order to obtain the ID3 tag recorded on the auxiliary information recording part 711 according to the request of the auxiliary information access when playing an MP3 data, as shown in FIG. 7. While the traverse motor 113 moves the optical pickup 112 from the position (3) to the position (4), the optical pickup 112 reads out the ID3 tag. Then, after completion of reading of the ID3 tag, the traverse motor 113 puts the optical pickup 112 back to the position (1) according to the request of the playback data access so as to play the MP3 audio data recorded on the playback data recording part 710. While the traverse motor 113 moves the optical pickup 112 from the position (1) to the position (2), the optical pickup 112 reads out the MP3 audio data. The system control part 114 outputs the playback signal.

Here, the operation that the auxiliary information access control part B421 requests the system control part 114 accessing of an auxiliary information will be explained in further detail. The playback control part D420 manages the playback ID management table part 124. The playback management table A824, which is an example of the playback ID management table 124 shown in FIG. 5, is a table in which unique playback IDs (1 to N) are respectively given to a plurality of MP3 audio data recorded on the optical disk 110, and the absolute recording positions on the optical disk 110 respectively correspond to those MP3 audio data. However, the playback IDs are not necessarily limited to be natural and consecutive numbers, and also the absolute recording positions are not always necessary. The playback control part D420 refers to such the playback ID management table A824, and all of (or finite number of) the playback IDs of MP3 audio data played so far are temporarily stored in the playback ID record storing part B525 during the playback operation. In addition, at the same time, the auxiliary-information (ID3 tags) added to all of (or finite number of) the MP3 audio data played so far are stored in the auxiliary information record storage part B528 keeping the correspondence with the playback IDs. Next, when the playback of the MP3 audio data presently being played is finished, the control flow proceeds to a process of playback of the next MP3 audio data. At this time, the playback ID comparing part B426 compares the playback ID of the MP3 audio data to be played next with the playback IDs of all of (or finite number of) the MP3 audio data played so far and temporarily stored in the auxiliary information record storage part B525; if there is an identical ID, the auxiliary information access necessity determining part B427 instructs the auxiliary information access control part B421 not to access the auxiliary information but to reuse the auxiliary information together with the playback IDs. The auxiliary information access control part B421 does not request to the system control part 114 accessing for re-obtaining the auxiliary information from the optical disk 110 but request to the auxiliary information record storage part B528 for obtaining the specified auxiliary information (ID3 tag) among the auxiliary information (ID3 tags) stored therein to realize the reuse of the auxiliary information (ID3 tag).

Comparison between the playback ID of the MP3 audio data to be played next and all of (or a finite number of) the playback IDs of the MP3 audio data temporarily stored in the playback ID record storing part B525 is execute; and if there are no identical IDs, the auxiliary information access necessity determining part B427 instructs the information access control part B421 to access the auxiliary information.

Furthermore, since a gigantic memory is required for storing all of (or a finite number of) the playback IDs and the auxiliary information (ID3 tag) played so far in the playback ID record storing part B525 and the auxiliary information record storage part B528, by keeping a constant monitoring of the playback ID by the playback frequency determining part 529 and instructing the playback ID record storing part B525 and the auxiliary information record storage part B528 to delete the playback IDs with low playback frequency, thereby the number of the playback ID and the auxiliary information (ID3 tag) is suppressed to a minimum to efficiently realize the reuse of the auxiliary information (ID3 tag) only for those playback IDs with high playback frequency.

In addition, the playback ID management table B924, which is an example of the playback ID management table 124 is shown in FIG. 9, is a table in which unique optical disk IDs (1 to M) are respectively given to optical disks to identify the optical disk 110, unique playback IDs (1 to N) on the optical disk 110 are respectively given to a plurality of MP3 audio data recorded on the optical disk 110, and also the absolute recording positions on the optical disk 110 respectively correspond to those MP3 audio data, as described in Embodiment 4. As described above, by managing not only the playback ID but also the optical disk, and at the same time, by processing in a similar way using a pair of optical disk ID and playback ID as a playback ID in the playback ID record storing part B525, the playback ID comparing part B426, the auxiliary information record storage part B528, and the playback frequency determining part 529, the above-mentioned process can be realized astride a plurality of optical disks.

In addition, the above-mentioned respective Embodiments are explained on the assumption that the recording medium controlled by the recording medium control apparatus is an optical disk and the data are read out from the recording medium by combining a spindle motor, a traverse motor, and an optical pickup. However, the recording medium is not limited to the optical disk, other recording medium except the optical disk such as a magnetic disk or the like is available. Therefore, the pickup from the recording medium is not limited to the optical pickup; the other reading configuration except the optical pickup is available. Accordingly, exclusion of such configuration is not intended.

In addition, in the above-described respective Embodiments are explained on the assumption the case that the playback data recorded on an optical disk are MP3 audio data, and the auxiliary information (ID3 tag) is added on the tail of the MP3 audio data. However, it is not limited to the above-mentioned case, it is also applicable in the case that the auxiliary information data (ID3 tag) is added to the head of the MP3 audio data, or to various data including the auxiliary information such as MPEG video data, or WMA (Windows® Media Audio) data or the like, and hence, exclusion of such configuration is not intended.

For example, in the case that the auxiliary information (ID3 tag) is added to the head of MP3 audio data and auxiliary information is stored in the auxiliary information storage part or the auxiliary information record storage part, the distance that the traverse motor drives the optical pickup can be short since the optical pickup is not required to read out the auxiliary information from the recording medium.

Furthermore, the above-mentioned respective Embodiments are explained with the configuration in which the movement of the optical pickup is realized by the traverse motor. However, other configurations such that the case of an arm type (scheme of moving on a circular arc having a pivot as a reference point) for the pickup driving part for driving the pickup are also applicable, and hence, exclusion of such configuration is not intended.

As described above, in a battery operable recording medium control apparatus of the present invention, in which, while playing the playback data such as an MP3 audio data or the like recorded on an optical disk or the like, for example, the auxiliary information associated therewith such as ID3 tag is displayed on a display medium such as an LCD or the like, the following effects can be obtained.

(1) In the case that the ID of the audio data presently played and the ID of the audio data to be played in the next time are identical to each other, by not executing the control for obtaining auxiliary information such as the ID tag from the recording medium at the time of next playback, the auxiliary information, such as an ID3 tag, from an internal memory is reused without moving an access part, that is, an optical pickup by a traverse motor. According to this configuration, the consumption of current in the access part is suppressed, and increase of battery operation duration time can be realized.

(2) In the case that the playback mode wherein playback is presently being made is one-music-piece repeat mode, by not executing the control in order to obtain the auxiliary information from the recording medium for the second playback or after that of repeat, the auxiliary information from the internal memory is reused without moving the access part. According to this configuration, the consumption of current in the traverse motor is suppressed, and the battery operation time can be extended.

(3) In the case that the playback is resumed after returning to the head or an intermediate position of the audio data by a key input or the like during the playback of the audio data, by not executing the control to obtain the auxiliary information from the recording medium at the time of the resumption of the playback, the auxiliary information from the internal memory is reused without moving the access part. According to this configuration, the consumption of current in the access part is suppressed, and the battery operation time can be extended.

(4) In the case that the IDs of the audio data that have been played so far are stored, and the ID of the audio data to be played next was already played in the past, by not executing the control to obtain the auxiliary information from the recording medium at the time of next playback, the auxiliary-information from the internal memory is reused without moving the access part. According to this configuration, the consumption of current in the access part is suppressed, and the battery operation time can be extended.

(5) In the case that the IDs of the audio data that have been played so far are stored to a minimum according to the playback frequency, and the ID of the audio data to be played next was already played in the past, by not executing the control to obtain the auxiliary information from the recording medium at the time of next playback, the auxiliary information from the internal memory is reused without moving the access part. According to this configuration, the consumption of current in the access part is suppressed, and the battery operation time can be extended, and at the same time, the internal memory for storing the auxiliary information can be reduced to a minimum.

Although the present invention has been described with respect to its preferred Embodiments in some detail, the disclosed contents of the preferred Embodiments may change in the details of the structure thereof, and any changes in the combination and sequence of the component may be attained without departing from the scope and spirit of the claimed invention.

INDUSTRIAL APPLICABILITY

The recording medium control apparatus and the recording medium control method of the present invention can be utilized, for example, for the optical disk recording and/or playback apparatus and method.

The invention claimed is:

1. An apparatus for reproducing at least one set of playback data and bibliographic information associated with the playback data from a recording medium, each of the bibliographic information contiguously recorded at an end of the corresponding playback data and different from information for reproducing the corresponding playback data, by controlling a spindle motor for rotating the recording medium, a pickup for reading out the playback data and the bibliographic information from the recording medium, and a traverse motor for moving the pickup, the apparatus comprising:

a playback control part for storing a table including a relation between: (a) each identification information for identifying each set of the playback data and the bibliographic data, and (b) recording location on the recording medium of each set;

a playback ID storing part for storing the identification information of the playback data which is presently reproduced;

an auxiliary information storage part which stores, during playback operation, the bibliographic information associated with the presently reproduced playback data;

a comparator for reading out next identification information of next playback data which is to be next reproduced from the playback control part, comparing the identification information stored in the playback ID storing part with the next identification information, and outputting a resulting comparison result whether or not the next identification information is present in the playback ID storing part; and a controller for controlling the spindle motor, the pickup and the traverse motor, wherein, in response to the comparison result that the next identification information is not present in the playback ID storing part, the controller controls the traverse motor to pass the next playback data and move to the end of the next playback data, and controls the pickup to reproduce the bibliographic information contiguously recorded at the end of the next playback data and associated with the next playback data from the recording medium, and wherein, in response to the comparison result that the next identification information is present in the playback ID storing part, the controller reads out the bibliographic information from the auxiliary information storage part, as next bibliographic information of the next playback data which is to be next reproduced, without any control to the traverse motor.

2. The apparatus as claimed in claim 1, wherein the identification information are playback IDs each uniquely identifying each set of the playback data and the bibliographic data.

3. The apparatus as claimed in claim 2, wherein the playback ID storing part further stores a plurality of the identification information of the playback data that have been reproduced in the past, wherein the auxiliary information storage part further stores a plurality of bibliographic information each associated with each of the identification information stored in the playback ID storing part, so that the plurality of bibliographic information correspond to the identification information stored in the playback ID storing part, respectively, wherein the comparator compares each of the identification information stored in the playback ID storing part with the next identification information, and outputting the resulting comparison result whether or not the next identification information is present in the playback ID storing part, and wherein, in response to the comparison result that the next identification information is present in the playback ID storing part, the controller reads out the bibliographic information corresponding to the next identification information from the auxiliary information storage part, as next bibliographic information of the playback data which is to be next reproduced, without any control to the traverse motor.

4. The apparatus as claimed in claim 3, wherein the apparatus reproduces at least one set of playback data and bibliographic information associated with the playback data from one of a plurality of recording mediums, wherein the table stored in the playback control part includes a relation between: (a) medium identification information for identifying each of the recording mediums and each identification information for identifying each set of the playback data and the bibliographic data in each of the recording medium, and (b) recording location on each of the recording medium of each set.

5. The apparatus as claimed in claim 3, further comprising a playback frequency determining part for detecting playback frequencies of playback data each having the identification information stored in the playback ID storing part, and searching identification information of playback data each having low playback frequency, deleting the searched identification information from the playback ID storing part, and deleting bibliographic information corresponding to the searched identification information from the auxiliary information storage part.

6. The apparatus as claimed in claim 5, wherein the apparatus reproduces at least one set of playback data and bibliographic information associated with the playback data from one of a plurality of recording mediums, wherein the table stored in the playback control part includes a relation between: (a) medium identification information for identifying each of the recording mediums and each identification information for identifying each set of the playback data and the bibliographic data in each of the recording medium, and (b) recording location on each of the recording medium of each set.

7. An apparatus for reproducing at least one set of playback data and bibliographic information associated with the playback data from a recording medium, each of the bibliographic information contiguously recorded at an end of the corresponding playback data and different from information for reproducing the corresponding playback data, by controlling a spindle motor for rotating the recording medium, a pickup for reading out the playback data and the bibliographic information from the recording medium, and a traverse motor for moving the pickup, the apparatus comprising:

a repeat-playback key for inputting a repeat-playback instruction to reproduce repeatedly the playback data which is presently reproduced, an auxiliary information storage part which stores, during playback operation, the bibliographic information associated with the presently reproduced playback data; and a controller for controlling the spindle motor, the pickup and the traverse motor, wherein, when the controller reproduces next playback data which is to be next reproduced, in response to no input of the repeat-playback instruction, the controller controls the traverse motor to pass the next playback data and move to the end of the next playback data, and controls the pickup to reproduce the bibliographic information contiguously recorded at the end of the next playback data and associated with the next playback data from the recording medium, and in response to input of the repeat-playback instruction, the controller reads out the bibliographic information from the auxiliary information storage part, as next bibliographic information of the playback data which is to be next reproduced, without any control to the traverse motor.

8. An apparatus for reproducing at least one set of playback data and bibliographic information associated with the playback data from a recording medium, each of the bibliographic information contiguously recorded at an end of the corresponding playback data and different from information for reproducing the corresponding playback data, by controlling a spindle motor for rotating the recording medium, a pickup for reading out the playback data and the bibliographic information from the recording medium, and a traverse motor for moving the pickup, the apparatus comprising:

a reverse-skip key for inputting a reverse-skip instruction to resume the playback of the playback data which is presently reproduced, from one of a head of the playback data which is presently reproduced and a position prior to the position presently reproduced;

an auxiliary information storage part which stores during playback operation, the bibliographic information associated with the presently reproduced playback data; and a controller for controlling the spindle motor, the pickup and the traverse motor, wherein, when the controller reproduces next playback data which is to be next reproduced, in response to no input of the reverse-skip instruction, the controller controls the traverse motor to pass the next playback data and move to the end of the next playback data, and controls the pickup to reproduce the bibliographic information contiguously recorded at the end of the next playback data and associated with the next playback data from the recording medium, and in response to input of the reverse-skip instruction, the controller reads out the bibliographic information from the auxiliary information storage part, as next bibliographic information of the playback data which is to be next reproduced, without any control to the traverse motor.

9. A method of reproducing at least one set of playback data and bibliographic information associated with the playback data from a recording medium, each of the bibliographic information contiguously recorded at an end of the corresponding playback data and different from information for reproducing the corresponding playback data, a pickup for reading out the playback data and the bibliographic information from the recording medium, and a traverse motor for moving the pickup, the method includes the following steps of:

storing a table including a relation between: (a) each identification information for identifying each set of the playback data and the bibliographic data, and (b) a recording location on the recording medium of each set in a playback control part;

storing the identification information of the playback data which is presently reproduced in a playback ID storing part;

storing during playback operation, the bibliographic information associated with playback data which is presently reproduced in an auxiliary information storage part;

reading out next identification information of the playback data which is to be next reproduced from the playback control part, comparing the identification information stored in the playback ID storing part with the next identification information, and outputting a resulting comparison result whether or not the next identification information is present in the playback ID storing part, in response to the comparison result that the next identification information is not present in the playback ID storing part, controlling the traverse motor to pass the next playback data and move to the end of the next playback data, and controlling the pickup to reproduce the bibliographic information contiguously recorded at the end of the next playback data and associated with the next playback data from the recording medium, and in response to the comparison result that the next identification information is present in the playback ID storing part, reading out the bibliographic information from the auxiliary information storage part, as next bibliographic information of the next playback data which is to be next reproduced, without any control to the traverse motor.

* * * * *

UNITED STATES PATENT AND TRADEMARK OFFICE
CERTIFICATE OF CORRECTION

PATENT NO. : 7,577,062 B2  Page 1 of 1
APPLICATION NO. : 10/559061
DATED : August 18, 2009
INVENTOR(S) : Tomoda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this

Seventh Day of September, 2010

David J. Kappos
*Director of the United States Patent and Trademark Office*